United States Patent
Atienza et al.

(10) Patent No.: US 11,168,162 B2
(45) Date of Patent: Nov. 9, 2021

(54) PROCESS FOR PRODUCING OLEFIN TERPOLYMERS WITH BRIDGED PHENOLATE TRANSITION METAL COMPLEXES

(71) Applicant: ExxonMobil Chemical Patents Inc., Baytown, TX (US)

(72) Inventors: Crisita Carmen H. Atienza, Houston, TX (US); Rhutesh K. Shah, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 97 days.

(21) Appl. No.: 16/597,695

(22) Filed: Oct. 9, 2019

(65) Prior Publication Data
US 2020/0123291 A1    Apr. 23, 2020

Related U.S. Application Data

(60) Provisional application No. 62/749,338, filed on Oct. 23, 2018.

(51) Int. Cl.
| | |
|---|---|
| *C08F 210/18* | (2006.01) |
| *C08F 4/64* | (2006.01) |
| *C08F 4/76* | (2006.01) |
| *C08F 4/44* | (2006.01) |

(52) U.S. Cl.
CPC ........ *C08F 210/18* (2013.01); *C08F 4/64186* (2013.01); *C08F 4/44* (2013.01); *C08F 4/64189* (2013.01)

(58) Field of Classification Search
CPC . C08F 4/64189; C08F 4/64186; C08F 210/18
See application file for complete search history.

(56) References Cited

U.S. PATENT DOCUMENTS

| | | | |
|---|---|---|---|
| 7,511,106 B2 | 3/2009 | Ravishankar | |
| 9,745,327 B2 * | 8/2017 | Atienza | C07F 7/00 |
| 9,982,076 B2 * | 5/2018 | Ye | C08F 210/16 |
| 9,994,658 B2 * | 6/2018 | Atienza | C08F 210/16 |
| 10,280,235 B2 * | 5/2019 | Luo | C08F 210/06 |
| 10,329,360 B2 * | 6/2019 | Luo | C08F 2/001 |
| 10,358,397 B2 | 7/2019 | Evans et al. | |
| 10,611,857 B2 * | 4/2020 | Atienza | C08F 10/02 |
| 2017/0275409 A1 | 9/2017 | Tsou et al. | |
| 2018/0057513 A1 | 3/2018 | Cano et al. | |
| 2019/0040161 A1 * | 2/2019 | Atienza | C08F 10/02 |
| 2020/0048382 A1 * | 2/2020 | Holtcamp | C08F 210/16 |
| 2020/0101450 A1 * | 4/2020 | Atienza | C08F 210/16 |

FOREIGN PATENT DOCUMENTS

| | | | |
|---|---|---|---|
| WO | 2015/0142547 | 9/2015 | ............ C08F 210/18 |
| WO | 2016/0094866 | 6/2016 | ................ C08F 4/02 |
| WO | 2016/0094870 | 6/2016 | ................ C08F 4/02 |

OTHER PUBLICATIONS

U.S. Appl. No. 62/609,364, filed Dec. 22, 2017, Tsou, Andy H. et al.
U.S. Appl. No. 62/627,402, filed Feb. 7, 2018, Atienza, Crisita C. H. et al.
U.S. Appl. No. 62/628,420, filed Feb. 9, 2018, Atienza, Crisita C. H. et al.
U.S. Appl. No. 62/640,336, filed Mar. 8, 2018, Carpenter, Alex E. et al.
U.S. Appl. No. 62/645,846, filed Mar. 21, 2018, Kandel, Kapil et al.
U.S. Appl. No. 62/662,972, filed Apr. 26, 2018, Faler, Catherine A. et al.
U.S. Appl. No. 62/662,981, filed Apr. 26, 2018, Faler, Catherine A. et al.
U.S. Appl. No. 62/698,470, filed Jul. 16, 2018, Faler, Catherine A. et al.
U.S. Appl. No. 62/723,809, filed Aug. 28, 2018, Atienza, Crisita C. H. et al.
U.S. Appl. No. 62/733,984, filed Sep. 20, 2018, Faler, Catherine A. et al.
U.S. Appl. No. 62/734,004, filed Sep. 20, 2018, Atienza, Crisita C. H. et al.
U.S. Appl. No. 62/737,391, filed Sep. 27, 2018, Atienza, Crisita C. H. et al.
Dullaert, K. et al. (2013) "Quantitative Assessment of the Branching Architecture of EPDM with High Content of 5-Vinyl-2-Norbomene as Third Monomer," *Rubber Chemistry and Technology*, v.86(4), pp. 503-520.

\* cited by examiner

*Primary Examiner* — Rip A Lee

(57) ABSTRACT

The present disclosure provides polymerization processes to produce polymeric materials, such as olefin terpolymers, using transition metal catalysts having bridged phenolate ligands. The polymerization process includes contacting a transition metal complex with a mixture olefin monomers that contain ethylene, propylene, and a cyclic diene to produce an olefin polymer and recovering the olefin polymer. The mixture of olefin monomers can include specified weight ratios for the various olefin monomers. The transition metal complex includes a bridged phenolate ligand bonded to a metal atom via covalent bonds by two oxygens, a coordinate covalent bond by a Group 15 atom, and a coordinate covalent bond by a Group 15 or 16 atom. The transition metal complex provides relatively high endocyclic alkene/vinyl selectivity to minimize hyperbranching during the production of olefin polymeric materials, such as EPDM and other terpolymers that are free or substantially free of gels.

35 Claims, 2 Drawing Sheets

PROCESS FOR PRODUCING OLEFIN TERPOLYMERS WITH BRIDGED PHENOLATE TRANSITION METAL COMPLEXES

CROSS REFERENCE TO RELATED APPLICATIONS

This application claims the benefit of Provisional Application No. 62/749,338, filed Oct. 23, 2018, the disclosure of which is incorporated herein by reference.

FIELD

The present disclosure provides process for producing polymeric materials with catalysts containing bridged phenolate transition metal complexes.

BACKGROUND

Polyolefins are widely used commercially because of their robust physical properties. For example, various types of polyethylenes, including high density, low density, and linear low density polyethylenes, are some of the most commercially useful. Polyolefins are typically prepared with a catalyst that polymerizes olefin monomers. Therefore, there is interest in finding new catalysts and catalyst systems that provide polymers having improved properties.

Low density polyethylene is generally prepared at high pressure using free radical initiators, or in gas phase processes using Ziegler-Natta or vanadium catalysts. Low density polyethylene typically has a density in the range of about 0.916 g/cm$^3$ to about 0.940 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., about 0.916 g/cm$^3$ to about 0.940 g/cm$^3$, which is linear and does not contain long chain branching, is known as "linear low density polyethylene" ("LLDPE") and is typically produced by conventional Ziegler-Natta catalysts or with metallocene catalysts. "Linear" means that the polyethylene has few, if any, long chain branches, typically referred to as a g'$_{vis}$ value of 0.97 or above, such as 0.98 or greater. Polyethylenes having still greater density are the high density polyethylenes ("HDPEs"), e.g., polyethylenes having densities greater than 0.940 g/cm$^3$, and are generally prepared with Ziegler-Natta catalysts or chrome catalysts. Very low density polyethylenes ("VLDPEs") can be produced by a number of different processes yielding polyethylenes having a density less than 0.916 g/cm$^3$, typically about 0.890 g/cm$^3$ to about 0.915 g/cm$^3$ or about 0.900 g/cm$^3$ to about 0.915 g/cm$^3$.

One category of polyolefins that has found a variety of applications is ethylene propylene diene monomer (EPDM) terpolymers, elastomers, and rubbers. Commercial applications for EPDM's include belts, hoses, flashing materials, and insulators for wire and cable. A typical EPDM contains ethylene, propylene, and one or more other dienes and/or one or more vinyls, such as 5-vinyl-2-norbornene (VNB), 5-ethylidene-2-norbornene (ENB), dicyclopentadiene (DCPD), and others. The use of VNB combined with ethylene and propylene results in faster cure rates and improved cure efficiencies with peroxides compared with other EPDM grades that contain ENB or DCPD as the diene. A major challenge in the production of VNB-EPDM is gel formation from the reaction of the pendant vinyl group. During the reaction, low endocyclic alkene/vinyl selectivity by the catalyst produces increased hyperbranching which results in greater product viscosity, such as a gel.

Therefore, there is a need for catalysts with a relatively high endocyclic alkene/vinyl selectivity to minimize hyperbranching during the production of olefin polymeric materials, such as EPDM, while maintaining or increasing polyolefin productivity.

References of interest include: U.S. Ser. No. 15/948,323, filed Apr. 9, 2018; U.S. Ser. No. 16/005,089, filed Jun. 11, 2018; U.S. Ser. No. 62/609,364, filed Dec. 22, 2017; U.S. Ser. No. 62/628,420, filed Feb. 9, 2018; U.S. Ser. No. 62/627,402, filed Feb. 7, 2018; U.S. Ser. No. 62/640,336, filed Mar. 8, 2018; U.S. Ser. No. 62/645,846, filed Mar. 21, 2018; U.S. Ser. No. 62/662,972, filed Apr. 26, 2018; U.S. Ser. No. 62/662,981, filed Apr. 26, 2018; U.S. Ser. No. 62/698,470, filed Jul. 16, 2018; U.S. Ser. No. 62/723,809, filed Aug. 28, 2018; U.S. Ser. No. 62/733,984, filed Sep. 20, 2018; U.S. Ser. No. 62/734,004, filed Sep. 20, 2018; U.S. Ser. No. 62/737,391, filed Sep. 27, 2018; U.S. Pat. Pub. Nos. 2017/275409; 2018/030167; 2018/057513; U.S. Pat. Nos. 9,745,327; 9,982,076; 9,994,658; and PCT Pub. Nos. WO 2016/094870; WO 2016/094866.

SUMMARY

The present disclosure provides polymerization processes to produce an olefin polymers, such as olefin terpolymers, using a catalyst that is a transition metal complex having bridged phenolate ligands. The polymerization process includes contacting the transition metal complex with a mixture of olefin monomers that contain ethylene, propylene, and one or more cyclic dienes to produce an olefin polymer. The mixture of olefin monomers can include a weight ratio of the ethylene to the cyclic diene is about 20:1 to about 500:1, a weight ratio of the propylene to the cyclic diene is about 100:1 to about 1,000:1, and a weight ratio of the propylene to the ethylene is about 1:1 to about 40:1.

The method also includes obtaining olefin polymer, where the olefin polymer has an ethylene content of about 40 wt % to about 85 wt %, a propylene content of about 15 wt % to about 50 wt %, a cyclic diene content of about 0.05 wt % to about 5 wt %, and a g'$_{(vis)}$ value of about 0.90 to 1. In one or more examples, the olefin monomers include ethylene, propylene, and vinyl norbornene (VNB) and are contacted with the transition metal complex to produce ethylene propylene diene monomer (EPDM) materials, such as terpolymers, elastomers, and rubbers.

The bridged phenolate ligand is bonded to the metal atom via covalent bonds by two oxygens, a coordinate covalent bond by a Group 15 atom, and a coordinate covalent bond by a Group 15 or 16 atom. The transition metal complex or catalyst provides relatively high endocyclic alkene/vinyl selectivity to minimize hyperbranching during the production of olefin polymeric materials, such as EPDM and other terpolymers, that are free or substantially free of gels and are recovered at a rate of 99% or greater, based upon all monomers introduced into the polymerization reactor.

In one or more embodiments, the transition metal complex or catalyst is represented by Formula (I):

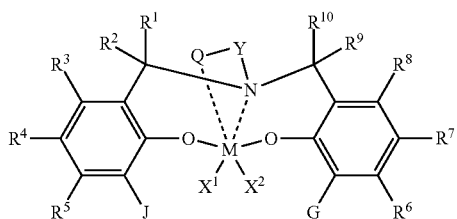

(I)

wherein:

M is a Group 4 transition metal;

$X^1$ and $X^2$ are, independently, a univalent $C_1$ to $C_{20}$ hydrocarbyl, a $C_1$ to $C_{20}$ substituted hydrocarbyl, a heteroatom or a heteroatom containing group, or $X^1$ and $X^2$ join together to form a $C_4$ to $C_{62}$ cyclic or polycyclic ring structure;

Q is a neutral donor group, typically containing at least one atom from Group 15 or Group 16 (such as O, N, S and P);

Y is a divalent $C_1$-$C_{40}$ (alternatively $C_1$-$C_{20}$) hydrocarbyl or substituted divalent hydrocarbyl group, and Y can form a substituted or unsubstituted heterocycle with Q which may or may not be aromatic and may or may not have multiple fused rings;

each $R^1$, $R^2$, $R^3$, $R^4$, $R^5$, $R^6$, $R^7$, $R^8$, $R^9$ and $R^{10}$ is, independently, a hydrogen, a $C_1$-$C_{40}$ hydrocarbyl, a $C_1$-$C_{40}$ substituted hydrocarbyl, a heteroatom or a heteroatom containing group, or two or more of adjacent $R^1$ to $R^{10}$ may independently join together to form a $C_4$ to $C_{62}$ cyclic, polycyclic or heterocyclic ring structure, or a combination thereof;

J is a $C_7$ to $C_{60}$ fused polycyclic (e.g., having at least 2 ring structures) group, which optionally contains up to 20 atoms from Groups 15 and 16, where at least one ring is aromatic, or may independently form a $C_4$ to $C_{60}$ cyclic or polycyclic ring structure with $R^3$, $R^4$, or $R^5$ or a combination thereof; and G is as defined for J or may be hydrogen, a $C_1$-$C_{60}$ hydrocarbyl, a $C_1$-$C_{60}$ substituted hydrocarbyl, a heteroatom or a heteroatom containing group, or may independently form a $C_4$ to $C_{60}$ cyclic or polycyclic ring structure with $R^6$, $R^7$, or $R^8$ or a combination thereof.

In some embodiments, the present disclosure provides a catalyst system that includes the catalyst or transition metal represented by Formula (I), one or more activators, and/or one or more scavengers.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of scope, for the disclosure may admit to other equally effective implementations.

Figure 1:
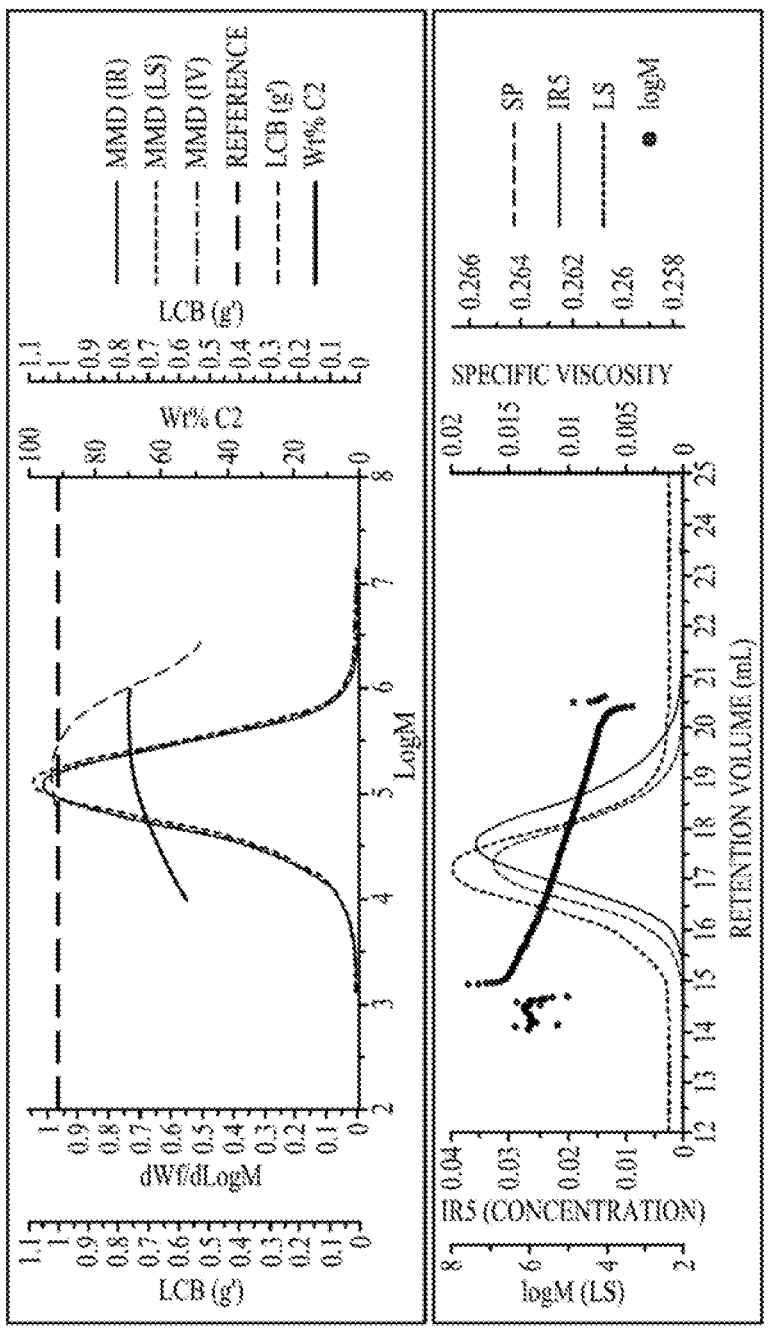
FIG. 1 is a GPC-4D plot showing two graphs and summarized data collected on a terpolymer produced by processes described and discussed herein, according to one embodiment.

To facilitate understanding, identical reference numerals have been used, where possible, to designate identical elements that are common to the FIGs. It is contemplated that elements and features of one implementation may be beneficially incorporated in other implementations without further recitation.

DETAILED DESCRIPTION

The present disclosure provides catalysts containing bridged phenolate transition metal complexes, production, and uses thereof. Catalysts of the present disclosure are transition metal complexes that have a bridged phenolate ligand located on the transition metal. The catalyst has a relatively high endocyclic alkene/vinyl selectivity to minimize hyperbranching during the production of olefin polymeric materials, such as ethylene propylene diene monomer (EPDM) materials, for example, vinyl norbornene (VNB)-EPDM. Without being bound by theory, it is believed that the relatively high catalytic activity is at least in part due to the bridged phenolate ligands being bonded to the metal atom via covalent bonds by two oxygens, a coordinate covalent bond by a Group 15 atom, and a coordinate covalent bond by a Group 15 or 16 atom. The coordinate covalent bonds, in part, provide an adduct or a coordination complex between the metal and the ligand.

The specification describes catalysts that are transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bonds, electron donation coordination, and/or intermediate bonds. The transition metal complexes are generally subjected to activation to perform their polymerization or oligomerization function using an activator which is believed to create a cation as a result of the removal of an anionic group, often referred to as a leaving group, from the transition metal.

For the purposes of the present disclosure, the numbering scheme for the Periodic Table Groups is used as described in *Chemical and Engineering News* (1985) v.63(5), pg. 27. Therefore, a "Group 4 metal" is an element from Group 4 of the Periodic Table, e.g., Hf, Ti, or Zr.

The term "substituted" means that at least one hydrogen atom has been replaced with at least a non-hydrogen group, such as a hydrocarbyl group, a heteroatom, or a heteroatom containing group, such as halogen (such as Br, Cl, F or I) or at least one functional group such as —$NR*_2$, —$OR*$, —$SeR*$, —$TeR*$, —$PR*_2$, —$AsR*_2$, —$SbR*_2$, —$SR*$, —$BR*_2$, —$SiR*_3$, —$GeR*_3$, —$SnR*_3$, —$PbR*_3$, and the like, where each $R*$ is independently a hydrocarbyl or halocarbyl radical, and two or more $R*$ may join together to form a substituted or unsubstituted saturated, partially unsaturated or aromatic cyclic or polycyclic ring structure, or where at least one heteroatom has been inserted within a hydrocarbyl ring.

The terms "hydrocarbyl," "hydrocarbyl," "hydrocarbyl group," "alkyl radical," and "alkyl" are used interchangeably throughout this disclosure. Likewise, the terms "group", "radical", and "substituent" are also used interchangeably in this disclosure. For purposes of this disclosure, "hydrocarbyl" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyls are radicals in which at least one hydrogen atom of the hydrocarbyl has been substituted with at least a non-hydrogen group, such as a hydrocarbyl group, a heteroatom, or a heteroatom containing group, such as halogen (such as Br, Cl, F or I) or at least one functional group such as $-NR*_2$, $-OR*$, $-SeR*$, $-TeR*$, $-PR*_2$, $-AsR*_2$, $-SbR*_2$, $-SR*$, $-BR*_2$, $-SiR*_3$, $-GeR*_3$, $-SnR*_3$, $-PbR*_3$, and the like, or where at least one heteroatom has been inserted within a hydrocarbyl ring.

The term "diyl," "diyl group," and "diyl radical" are used interchangeably throughout this disclosure. For purposes of this disclosure, "diyl" is defined to be $C_1$-$C_{40}$ divalent groups that may be substituted or unsubstituted linear, branched, cyclic, polycyclic, heterocyclic, or aromatic. In examples throughout this disclosure, diyls can be or include, but are not limited to, $C_1$-$C_{40}$ diyls, $C_1$-$C_{25}$ diyls, $C_1$-$C_{18}$ diyls, $C_1$-$C_{12}$ diyls, $C_1$-$C_{10}$ diyls, and $C_1$-$C_5$ diyls. Examples of a $C_1$-$C_5$ diyl can be or include, but are not limited to, methanediyl ($-CH_2-$), ethanediyl ($-CH_2CH_2-$), propanediyl ($-CH_2CH_2CH_2-$), butanediyl ($-CH_2(CH_2)_2CH_2-$), and pentanediyl ($-CH_2(CH_2)_3CH_2-$), isomers thereof, halide-substituted analogues thereof, or other substituted analogues thereof.

The term "alkenyl" means a straight-chain, branched-chain, or cyclic hydrocarbon radical having one or more carbon-carbon double bonds. These alkenyl radicals may be substituted. Examples of suitable alkenyl radicals include, but are not limited to, ethenyl, propenyl, allyl, 1,4-butadienyl cyclopropenyl, cyclobutenyl, cyclopentenyl, cyclohexenyl, cyclooctenyl and the like including their substituted analogues.

The term "arylalkenyl" means an aryl group where a hydrogen has been replaced with an alkenyl or substituted alkenyl group. For example, styryl indenyl is an indene substituted with an arylalkenyl group (a styrene group).

The term "alkoxy" or "alkoxide" means an alkyl ether or aryl ether radical wherein the term alkyl is as defined above. Examples of suitable alkyl ether radicals include, but are not limited to, methoxy, ethoxy, n-propoxy, iso-propoxy, n-butoxy, iso-butoxy, sec-butoxy, tert-butoxy, phenoxy, and the like.

The term "aryl" or "aryl group" means a carbon-containing aromatic ring and the substituted variants thereof, including but not limited to, phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic; likewise, the term aromatic also refers to substituted aromatics.

The term "arylalkyl" means an aryl group where a hydrogen has been replaced with an alkyl or substituted alkyl group. For example, 3,5'-di-tert-butyl-phenyl indenyl is an indene substituted with an arylalkyl group.

The term "alkylaryl" means an alkyl group where a hydrogen has been replaced with an aryl or substituted aryl group. For example, ethylbenzyl indenyl is an indene substituted with an ethyl group bound to a benzyl group.

Reference to an alkyl, alkenyl, alkoxide, or aryl group without specifying a particular isomer (e.g., butyl) expressly discloses all isomers (e.g., n-butyl, iso-butyl, sec-butyl, and tert-butyl), unless otherwise indicated.

The term "ring atom" means an atom that is part of a cyclic ring structure. By this definition, a benzyl group has six ring atoms and tetrahydrofuran has 5 ring atoms. A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom substituted ring.

The term "catalyst system" is defined to mean a complex/activator pair. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system.

Catalysts of the presented disclosure represented by Formula (I) are intended to embrace ionic forms in addition to the neutral forms of the compounds.

"Complex" as used herein, is also often referred to as catalyst precursor, precatalyst, catalyst, catalyst compound, transition metal compound, or transition metal complex. These words are used interchangeably. Activator and cocatalyst are also used interchangeably.

A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Noncoordinating anion (NCA) means an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the noncoordinating anion. Suitable metals include, but are not limited to, aluminum, gold, and platinum. Suitable metalloids include, but are not limited to, boron, aluminum, phosphorus, and silicon. The term non-coordinating anion activator includes neutral activators, ionic activators, and Lewis acid activators.

"Catalyst productivity" is a measure of how many grams of polymer (P) are produced using a polymerization catalyst containing W g of catalyst (cat), over a period of time of T hours; and may be expressed by the following formula: P/(T×W) and expressed in units of gPgcat$^{-1}$ hr$^{-1}$. "Conversion" is the amount of monomer that is converted to polymer product, and is reported as mol % and is calculated based on the polymer yield and the amount of monomer fed into the reactor. "Catalyst activity" is a measure of the level of activity of the catalyst and is reported as the mass of product polymer (P) produced per mole of catalyst (cat) used (kgP/molcat).

For purposes herein an "olefin," alternatively referred to as "alkene," is a linear, branched, cyclic, or multi-cyclic compound containing carbon and hydrogen having at least one double bond. For purposes of this specification and the claims appended thereto, when a polymer or copolymer is referred to as containing an olefin, the olefin present in such polymer or copolymer is the polymerized form of the olefin. For example, when a copolymer is said to have a "propylene" content of 35 wt % to 55 wt %, it is understood that the mer unit in the copolymer is derived from propylene in the polymerization reaction and the derived units are present at 35 wt % to 55 wt %, based upon the weight of the copolymer.

For purposes herein a "polymer" has two or more of the same or different monomer ("mer") units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or less than 2,500 g/mol, or a low number of mer units, such as 75 mer units or less or 50 mer units or less. An "ethylene polymer" or "ethylene copolymer" is a polymer or copolymer containing at least 50 mol % ethylene derived units, a "propylene polymer" or "propylene copolymer" is a polymer or copolymer containing at least 50 mol % propylene derived units, and so on.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol.

The term "continuous" means a system that operates without interruption or cessation for a period of time, where reactants are continually fed into a reaction zone and products are continually or regularly withdrawn without stopping the reaction in the reaction zone. For example, a continuous process to produce a polymer would be one where the reactants are continually introduced into one or more reactors and polymer product is continually withdrawn.

A "solution polymerization" means a polymerization process in which the polymerization is conducted in a liquid polymerization medium, such as an inert solvent or monomer(s) or their blends. A solution polymerization is typically homogeneous. A homogeneous polymerization is one where the polymer product is dissolved in the polymerization medium. Such systems are not turbids as described in Oliveira, J. V. et al. (2000) *Ind. Eng. Chem. Res.*, v.29, pg. 4627.

A bulk polymerization means a polymerization process in which the monomers and/or comonomers being polymerized are used as a solvent or diluent using little or no inert solvent or diluent. A small fraction of inert solvent might be used as a carrier for catalyst and scavenger. A bulk polymerization system contains less than about 25 wt % of inert solvent or diluent, such as less than about 10 wt %, such as less than about 1 wt %, such as 0 wt %.

Ligands

In one or more embodiments, the present disclosure provides one or more ligands that can be contained in a transition metal complex or catalyst, as discussed and described herein. A ligand is represented by the Formula (II):

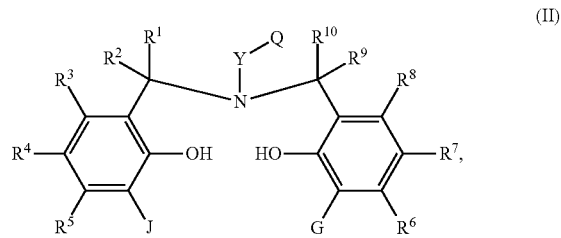

where:

Q is a neutral donor group, typically containing at least one atom from Group 15 or Group 16 (such as O, N, S and P);

Y is a divalent $C_1$-$C_{40}$ (e.g., $C_1$-$C_{20}$, $C_1$-$C_{10}$, or $C_1$-$C_5$) hydrocarbyl or substituted divalent hydrocarbyl group, and Y can form a substituted or unsubstituted heterocycle with Q which may or may not be aromatic and may or may not have multiple fused rings;

each $R^1$, $R^2$, $R^3$, $R^4$, $R^5$, $R^6$, $R^7$, $R^8$, $R^9$ and $R^{10}$ is, independently, a hydrogen, a $C_1$-$C_{40}$ hydrocarbyl, a substituted $C_1$-$C_{40}$ hydrocarbyl, a heteroatom, a heteroatom containing group (alternately each $R^1$, $R^2$, $R^3$, $R^4$, $R^5$, $R^6$, $R^7$, $R^8$, $R^9$ and $R^{10}$ may be a functional group containing elements from Groups 13-17), or two or more of $R^1$ to $R^{10}$ may independently join together to form a $C_4$ to $C_{62}$ cyclic or polycyclic ring structure, or a combination thereof (e.g., H, methyl, ethyl, propyl, or butyl);

J is a $C_7$ to $C_{60}$ fused polycyclic (e.g., having at least 2 ring structures) group, which optionally contains up to 20 atoms from Groups 15 and 16, where at least one ring is aromatic, or may independently form a $C_4$ to $C_{60}$ cyclic or polycyclic ring structure with $R^3$, $R^4$, or $R^5$ or a combination thereof; and G is, independently, as defined for J, a hydrogen, a $C_1$-$C_{60}$ hydrocarbyl, a substituted hydrocarbyl, a heteroatom, or a heteroatom containing group, or may independently form a $C_4$ to $C_{60}$ cyclic or polycyclic ring structure with $R^6$, $R^7$, or $R^8$ or a combination thereof.

In at least one embodiment, the ligand, which may be contained in a transition metal complex or catalyst, can be represented by the Formula (IIIa) or (IIIb):

(IIIa)

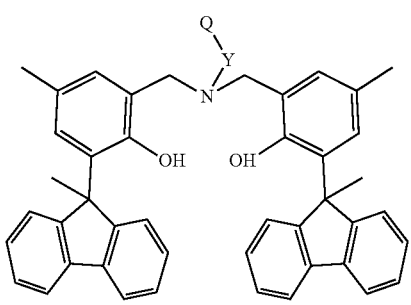

and (IIIb)

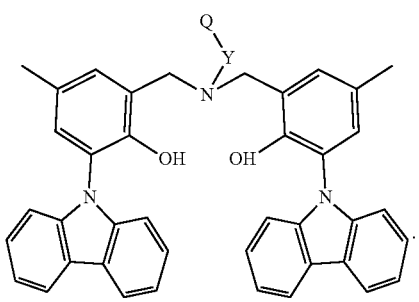

In one or more embodiments, a ligand, which may be contained in a transition metal complex or catalyst, is represented by Formula (II), (IIIa), or (IIIb) and can be one or more of the Formulas (L1)-(L4):

(L1)

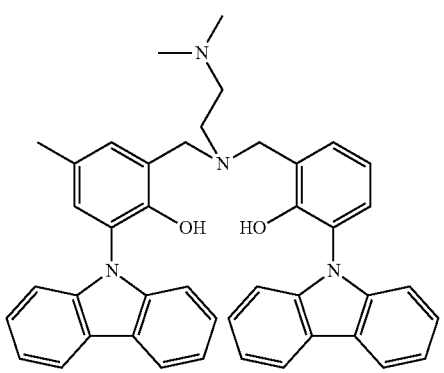

(L2)

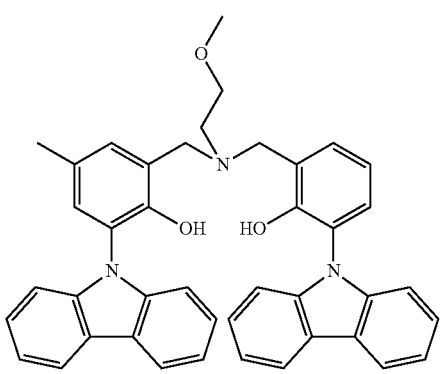

(L3)

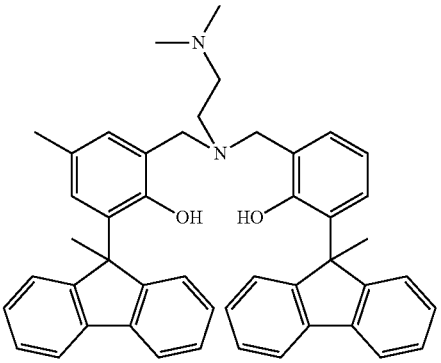

(L4)

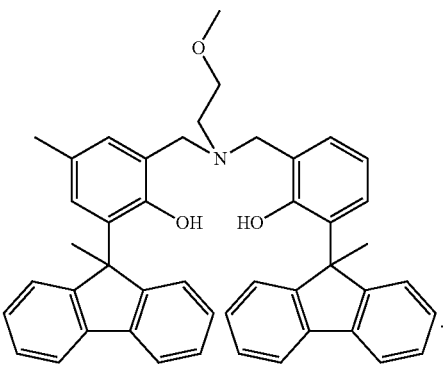

Catalysts

In a first aspect of the invention there is provided a transition metal complex (optionally for use in alkene polymerization) represented by the Formula (I):

(I)

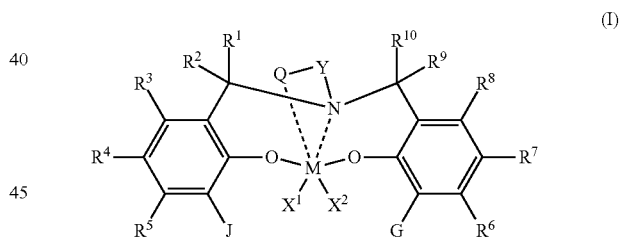

where:

M is a Group 4 transition metal, such as Hf, Zr, or Ti;

$X^1$ and $X^2$ are, independently, a univalent $C_1$ to $C_{20}$ hydrocarbyl, a $C_1$ to $C_{20}$ substituted hydrocarbyl, a heteroatom or a heteroatom containing group, or $X^1$ and $X^2$ join together to form a $C_4$ to $C_{62}$ cyclic or polycyclic ring structure (e.g., benzyl, methyl, ethyl, chloro, or bromo);

each $R^1$, $R^2$, $R^3$, $R^4$, $R^5$, $R^6$, $R^7$, $R^8$, $R^9$ and $R^{10}$ is, independently, a hydrogen, a $C_1$-$C_{40}$ hydrocarbyl, a substituted $C_1$-$C_{40}$ hydrocarbyl, a heteroatom, a heteroatom containing group (alternately each $R^1$, $R^2$, $R^3$, $R^4$, $R^5$, $R^6$, $R^7$, $R^8$, $R^9$ and $R^{10}$ may be a functional group containing of elements from Groups 13-17), or two or more of $R^1$ to $R^{10}$ may independently join together to form a $C_4$ to $C_{62}$ cyclic or polycyclic ring structure, or a combination thereof (e.g., H, methyl, ethyl, propyl, butyl, pentyl, or isomers thereof);

Q is a neutral donor group, for example, a neutral donor group containing at least one atom from Group 15 (e.g., N or P) or Group 16 (e.g., O, S, or Se);

J is a $C_7$ to $C_{60}$ fused polycyclic (e.g., having at least 2 ring structures) group, which optionally contains up to 20 atoms from Groups 15 and 16, where at least one ring is aromatic, or may independently form a $C_4$ to $C_{60}$ cyclic or polycyclic ring structure with $R^3$, $R^4$, or $R^5$ or a combination thereof;

G is, independently, as defined for J, a hydrogen, a $C_1$-$C_{60}$ hydrocarbyl, a substituted hydrocarbyl, a heteroatom, or a heteroatom containing group, or may independently form a $C_4$ to $C_{60}$ cyclic or polycyclic ring structure with $R^6$, $R^7$, or $R^6$ or a combination thereof; and Y is a divalent $C_1$ to $C_{20}$ hydrocarbyl or a substituted divalent hydrocarbyl group.

In another aspect, this invention relates to a catalyst compound represented by the Formula (IV) or (V):

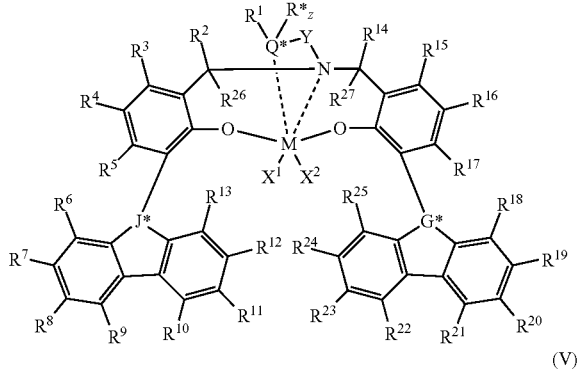

(IV)

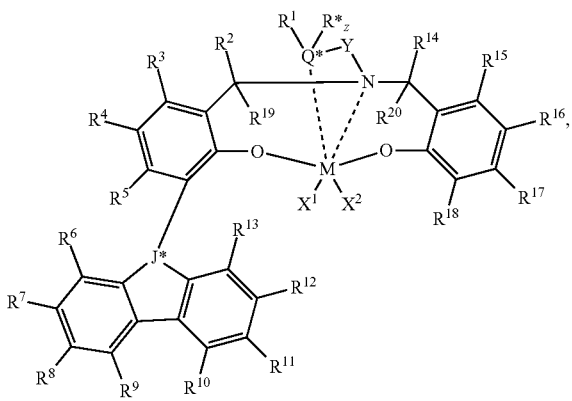

(V)

where:

M, $X^1$, $X^2$, $R^1$, $R^2$, $R^3$, $R^4$, $R^5$, $R^6$, $R^7$, $R^8$, $R^9$, $R^{10}$, and Y are as defined above;

each $R'''$, $R^*$, $R''$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, as defined for $R^1$ above;

Q* is a group 15 or 16 atom (e.g., N, O, S, or P);

z is 0 or 1;

J* is CR''' or N; and

G* is CR''' or N.

For purposes herein, any hydrocarbyl (and any alkyl) may be independently selected from methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

In any embodiment of the transition metal complexes described herein, each of $X^1$ and $X^2$ is independently one or more hydrocarbyls having from 1 to 20 carbon atoms (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl), hydrides, amides, alkoxides having from 1 to 20 carbon atoms, sulfides, phosphides, halides, sulfoxides, sulfonates, phosphonates, nitrates, carboxylates, carbonates and combinations thereof. In one or more examples, each of $X^1$ and $X^2$ is independently a halide (F, Cl, Br, I), an alkyl having from 1 to 7 carbon atoms (methyl, ethyl, propyl, butyl, pentyl, hexyl, heptyl, and isomers thereof), a benzyl, or any combination thereof.

In any embodiment of the transition metal complexes described herein Y is a divalent $C_1$-$C_{40}$ hydrocarbyl or divalent substituted hydrocarbyl containing a portion that has a linker backbone having from 1 to 18 carbon atoms linking or bridging between Q and N. In an embodiment, Y is a divalent $C_1$-$C_{40}$ hydrocarbyl or substituted hydrocarbyl containing a portion that has a linker backbone containing from 1 to 18 carbon atoms linking Q and N wherein the hydrocarbyl contains O, S, S(O), S(O)$_2$, Si(R')$_2$, P(R'), N or N(R'), wherein each R' is independently a $C_1$-$C_{18}$ hydrocarbyl. In an embodiment, Y is ethylene (—CH$_2$CH$_2$—) or 1,2-cyclohexylene. In an embodiment, Y is —CH$_2$CH$_2$CH$_2$— derived from propylene. In an embodiment, Y is a $C_1$ to $C_{20}$ alkyl group, such as divalent methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In a useful embodiment, each $R^1$, $R^2$, $R^3$, $R^4$, $R^5$, $R^6$, $R^7$, $R^8$, $R^9$ and $R^{10}$ is, independently, a hydrogen, a $C_1$-$C_{20}$ hydrocarbyl, a substituted $C_1$ to $C_{20}$ hydrocarbyl, or two or more of $R^1$ to $R^{10}$ may independently join together to form a $C_4$ to $C_{62}$ cyclic or polycyclic ring structure, or a combination thereof.

In any embodiment of the transition metal complexes described herein each $R^*$, $R''$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, hydrogen, a halogen, a $C_1$ to $C_{30}$ hydrocarbyl, a $C_1$ to $C_{20}$ hydrocarbyl, or a $C_1$ to $C_{10}$ hydrocarbyl (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl).

In any embodiment of the transition metal complexes described herein each $R^*$, $R''$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a substituted $C_1$ to $C_{30}$ hydrocarbyl, a substituted $C_1$ to $C_{20}$ hydrocarbyl, or a substituted $C_1$ to $C_{10}$ hydrocarbyl (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl)methyl).

In an embodiment, one or more of R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is a methyl, a fluoride, chloride, bromide, iodide, methoxy, ethoxy, isopropoxy, trifluoromethyl, dimethylamino, diphenylamino, adamantyl, phenyl, pentafluorphenyl, naphthyl, anthracenyl, dimethylphosphanyl, diisopropylphosphanyl, diphenylphosphanyl, methylthio, and phenylthio or a combination thereof.

In any embodiment of the transition metal complexes described herein Q* is N, O, S or P. In any embodiment of the transition metal complexes described herein when Q* is a Group 15 atom, z is 1, and when Q* is a group 16 atom, z is 0.

In any embodiment of the transition metal complexes described herein Q is a neutral donor group containing at least one atom from Group 15 or Group 16. In one or more examples, Q is $NR'_2$, OR', SR', $PR'_2$, where R' is as defined for $R^1$ (e.g., R' is methyl, ethyl, propyl, isopropyl, phenyl, cyclohexyl or linked together to form a 5-membered ring such as pyrrolidinyl or a six-membered ring such as piperidinyl). In other examples, the -(-Q-Y—)— fragment can form a substituted or unsubstituted heterocycle which may or may not be aromatic and may have multiple fused rings (for example see compound 7-Zr, 7-Hf in the examples below). In any embodiment of the transition metal complexes described herein Q can be or include an amine, ether, or pyridine.

In a useful embodiment of the transition metal complexes described herein G* and J* are the same, such as G* and J* are N, alternately G* and J* are CR''', where each R''' is H or a $C_1$ to $C_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tert-butylphenyl, fluorophenyl, diphenyl, dimethylaminophenyl, chlorophenyl, bromophenyl, iodophenyl, (trimethylsilyl)phenyl, (triethylsilyl)phenyl, (triethylsilyl)methyl, (triethylsilyl)methyl). In a useful embodiment of the transition metal complexes described herein G* and J* are different.

In a useful embodiment of the transition metal complexes described herein G and J are the same or different. For example, each G and J is independently carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, naphthyl, substituted naphthyl, anthracenyl, substituted anthracenyl, phenanthryl, or substituted phenanthryl. In a useful embodiment of the transition metal complexes described herein G and J are different.

In an embodiment, M is Zr or Hf; $X^1$ and $X^2$ are benzyls; $R^1$ is a methyl; $R^2$ through $R^{27}$ are hydrogen; Y is ethylene ($-CH_2CH_2-$), Q*, G* and J* are N, and Rz* is methyl.

In an embodiment, M is Zr or Hf; $X^1$ and $X^2$ are benzyl radicals; $R^4$ and $R^7$ are methyls; $R^1$ through $R^3$, $R^5$ through $R^6$ and $R^8$ through $R^{10}$ are hydrogen; and Y is ethylene ($-CH_2CH_2-$), Q is an N-containing or O-containing group, G and J are carbazolyl or fluorenyl. In some examples, G and J are carbazolyl and Q is an amine group; or, G and J are substituted fluorenyl and Q is an ether group.

In a particularly embodiment of the invention, the catalyst complex is represented by Formula (VI) or (VII):

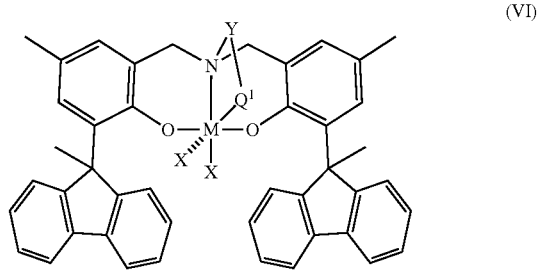

(VI)

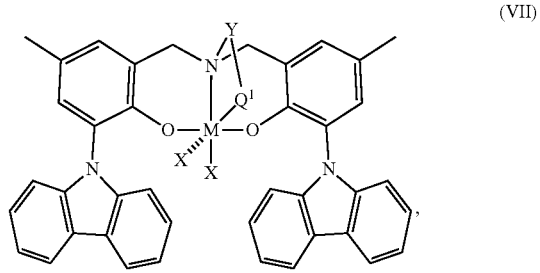

(VII)

where Y is a $C_1$-$C_3$ divalent hydrocarbyl, $Q^1$ is $NR'_2$, OR', SR', $PR'_2$, where R' is as defined for $R^1$ (e.g., R' is methyl, ethyl, propyl, isopropyl, phenyl, cyclohexyl or linked together to form a 5-membered ring such as pyrrolidinyl or a six-membered ring such as piperidinyl), alternately the -(-Q-Y—)— fragment can form a substituted or unsubstituted heterocycle which may or may not be aromatic and may have multiple fused rings, M is Zr, Hf or Ti and each X is, independently, as defined for $X^1$ above, in some examples, each X is benzyl, methyl, ethyl, chloride, bromide or alkoxide.

In one specific example, the transition metal complex or catalyst is represented by Formula (VIII):

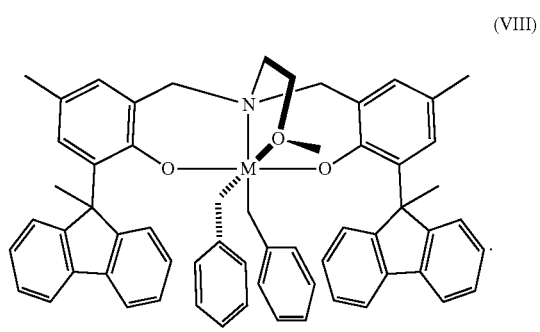

(VIII)

In other embodiments, the transition metal complex or the catalyst represented by any one of Formulas (I), (IV), (V), (VI), (VII), or (VIII) is one or more of the following:

1-Zr
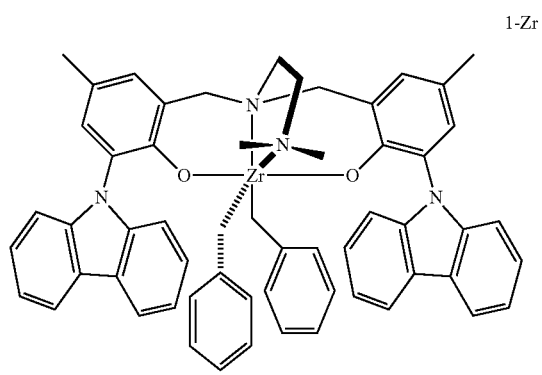
1-Hf
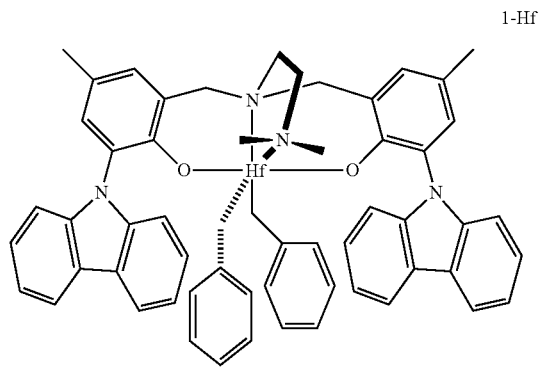
2-Zr
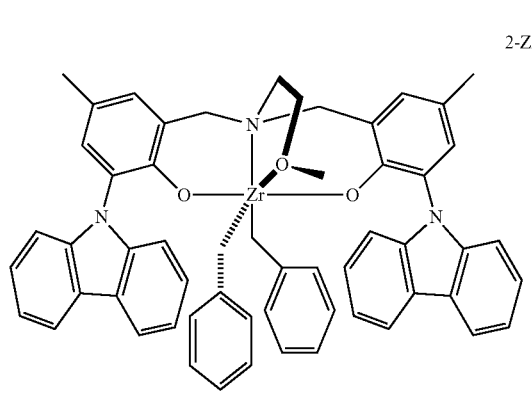
2-Hf
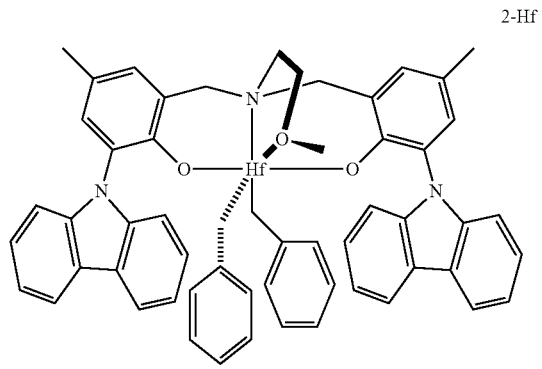
-continued
3-Zr
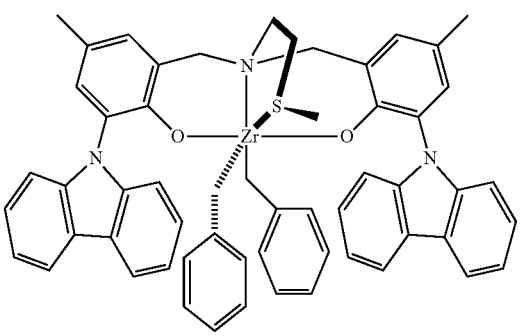
3-Hf
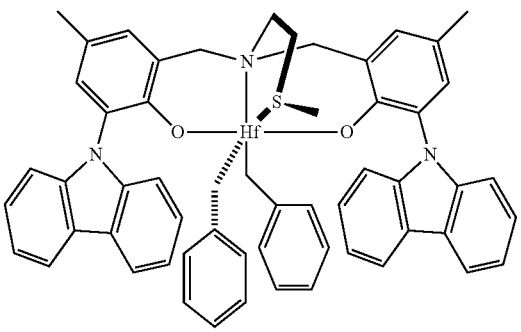
4-Zr
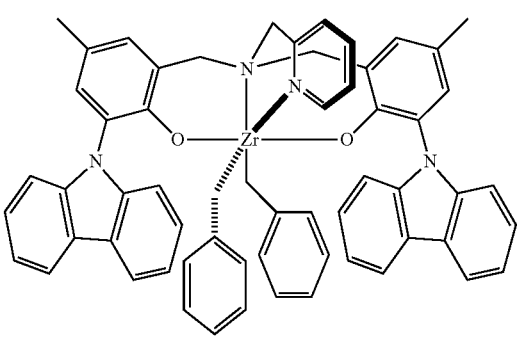
4-Hf
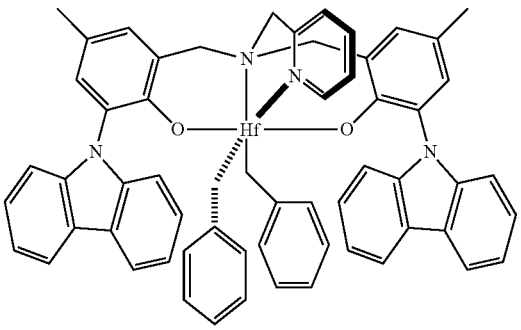

17
-continued

5-Zr
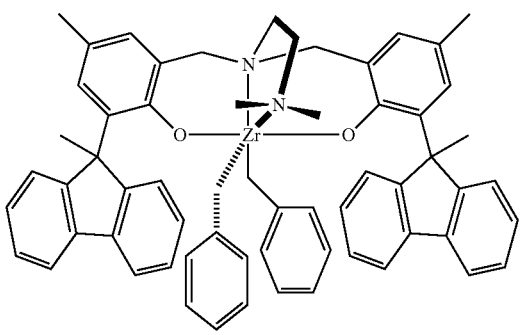

5-Hf
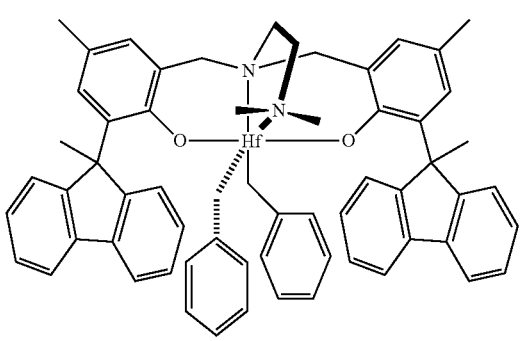

6-Zr
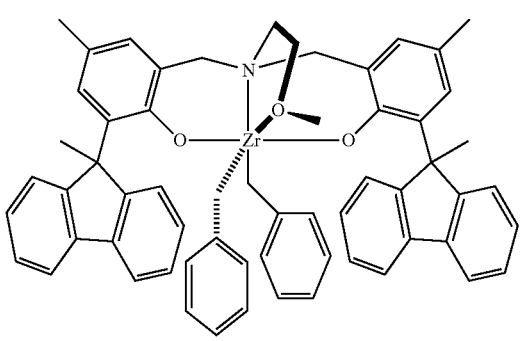

6-Hf
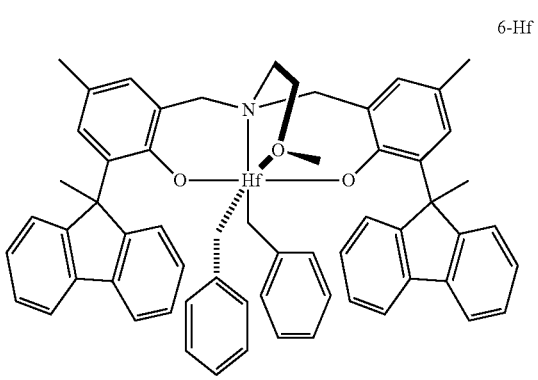

18
-continued

7-Zr
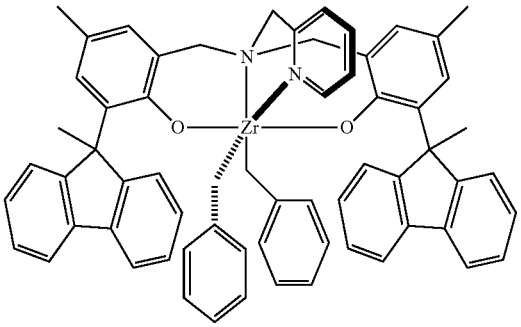

7-Hf
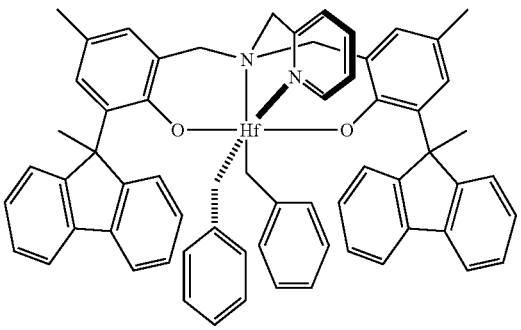

Methods to Prepare the Catalyst Compounds

All air sensitive syntheses are carried out in nitrogen or argon purged dry boxes. All solvents are available from commercial sources. Methylmagnesium bromide solution (Grignard reagent), 9H-fluoren-9-one, ammonium chloride, tetrahydrofuran, p-cresol, dichloromethane, concentrated sulfuric acid, paraformaldehyde, 2-methoxyethanamine, methanol, ethyl acetate, hexane, toluene, tetrabenzyl hafnium, tetrabenzyl zirconium, and other precursors, reagents, and solvents are available from commercial sources.

Generally, ligands of Formulas (II), (IIa), and (IIb) can be synthesized according to the schematic reaction procedure described in Schemes 1-3 and transition metal catalysts of Formulas (I) and (IV), (V), (VI), (VII), and (VIII) can be synthesized according to the schematic reaction procedure described in Scheme 4.

As shown in Scheme 1: 9H-fluoren-9-one is treated with the methyl Grignard reagent MeMgBr to produce 9-methyl-9H-fluoren-9-ol (S1).

Scheme 1

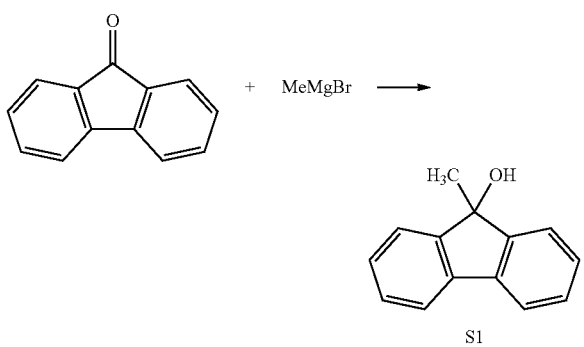

As shown in Scheme 2: 9-methyl-9H-fluoren-9-ol (S1) is treated with p-cresol and sulfuric acid to produce 4-methyl-2-(9-methyl-9H-fluoren-9-yl)phenol (S2).

produce the transition metal complex or catalysts of Formula (VIII), where M is zirconium.

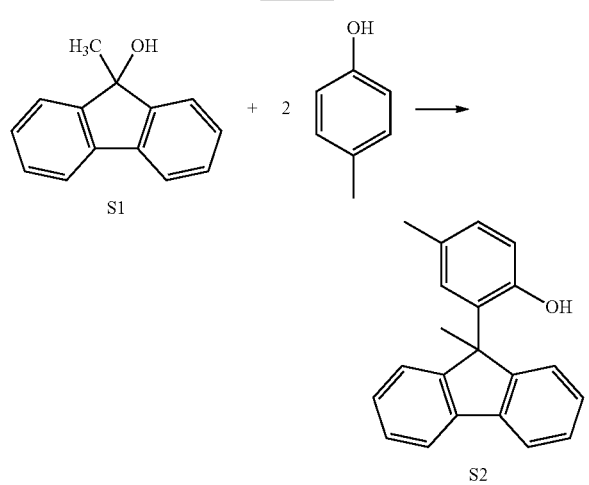

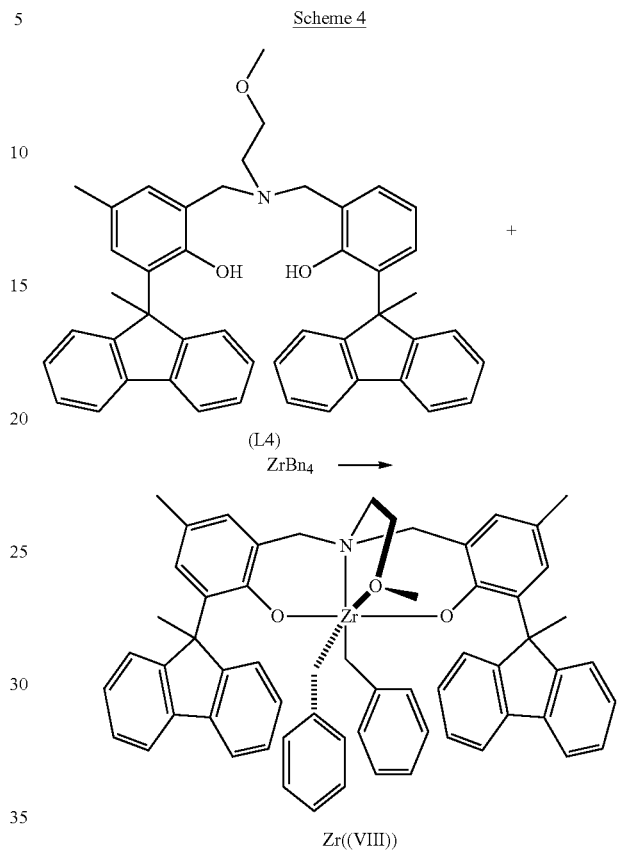

As shown in Scheme 3: 4-methyl-2-(9-methyl-9H-fluoren-9-yl)phenol (S2), paraformaldehyde, 2-methoxyethanamine, water, and methanol are combined and heated to produce the ligand of Formula (IV), also referred to as 2-(((2-hydroxy-3-(9-methyl-9H-fluoren-9-yl)benzyl)(2-methoxyethyl)amino)methyl)-4-methyl-6-(9-methyl-9H-fluoren-9-yl)phenol.

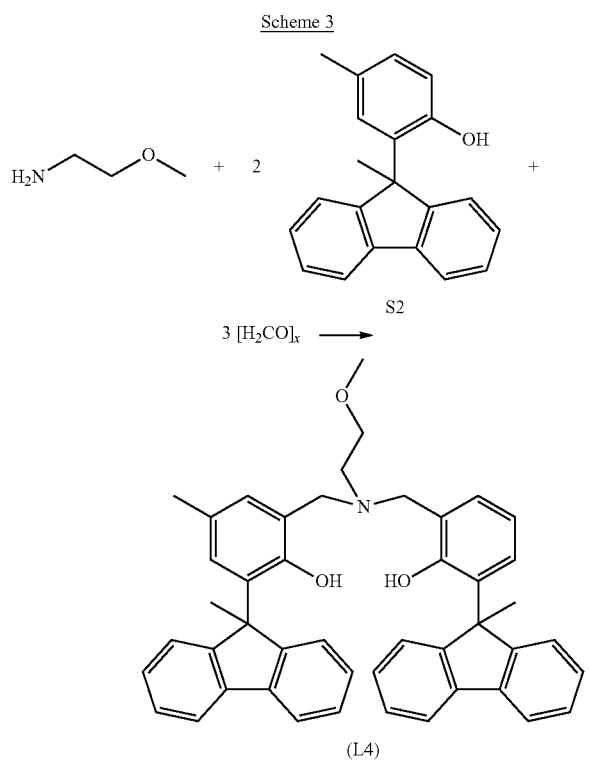

As shown in Scheme 4: the ligand of Formula (L4) is treated with tetrabenzyl zirconium (ZrBn₄) in toluene to Activators After the catalysts have been synthesized, catalyst systems may be formed by combining the catalysts with activators in any suitable manner, including by supporting them for use in slurry or gas phase polymerization. The catalyst systems may also be added to or generated in solution polymerization or bulk polymerization (in the monomer, such as, without solvent). The catalyst system typically contains a transition metal complex as described above and an activator such as alumoxane or a non-coordinating anion activator. Activation may be performed using alumoxane solution including an alkyl alumoxane such as methyl alumoxane, referred to as MAO, as well as modified MAO, referred to herein as MMAO, which contains some higher alkyl groups to improve the solubility. MAO can be purchased from Albemarle Corporation, Baton Rouge, La., typically in a 10 wt % solution in toluene. In one or more examples, activators that can be used in the catalyst system can be or include one or more alumoxanes, one or more aluminum alkyls, and other aluminum compounds. Exemplary activators that can be used in the catalyst system can be or include, but are not limited to, methyl alumoxane, ethyl alumoxane, isobutyl alumoxane, isobutyl alumoxane, trimethyl aluminum, triethyl aluminum, tripropyl aluminum, tributyl aluminum, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, triphenylcarbenium tetra (perfluorophenyl)borate, triphenylcarbenium tetrakis (perfluorophenyl)borate, 1-(4-(tris(pentafluorophenyl) borate)-2,3,5,6-tetrafluorophenyl)pyrrolidinium, tetrakis (pentafluorophenyl)borate, 4-(tris(pentafluorophenyl) borate)-2,3,5,6-tetrafluoropyridine, isomers thereof, substitutes thereof, or any combination thereof.

When an alumoxane or modified alumoxane is used, the catalyst-to-activator molar ratio is from about 1:3,000 to about 10:1; such as about 1:2,000 to about 10:1; such as about 1:1,000 to about 10:1; such as about 1:500 to about 1:1; such as about 1:300 to about 1:1; such as about 1:200 to about 1:1; such as about 1:100 to about 1:1; such as about 1:50 to about 1:1; such as about 1:10 to about 1:1. When the activator is an alumoxane (modified or unmodified), some embodiments select the maximum amount of activator at a 5,000-fold molar excess over the catalyst (per metal catalytic site). The minimum activator-to-catalyst ratio can be 1:1 molar ratio.

Another useful alumoxane is solid polymethylaluminoxane as described in U.S. Pat. Nos. 8,404,880; 8,975,209; and 9,340,630.

Activation may also be performed using non-coordinating anions, referred to as NCA's, of the type, for example, described in EP 277 003 A1 and EP 277 004 A1. NCA may be added in the form of an ion pair using, for example, [DMAH]+[NCA]− in which the N,N-dimethylanilinium (DMAH) cation reacts with a basic leaving group on the transition metal complex to form a transition metal complex cation and [NCA]−. The cation in the precursor may, alternatively, be trityl. Alternatively, the transition metal complex may be reacted with a neutral NCA precursor, such as $B(C_6F_5)_3$, which abstracts an anionic group from the complex to form an activated species. Useful activators include N,N-dimethylanilinium tetrakis (pentafluorophenyl)borate ($[PhNMe_2H]B(C_6F_5)_4$) and N,N-dimethylanilinium tetrakis (heptafluoronaphthyl)borate, where Ph is phenyl, and Me is methyl.

Additionally activators useful herein include those described in U.S. Pat. No. 7,247,687 at column 169, line 50 to column 174, line 43, particularly column 172, line 24 to column 173, line 53.

In another embodiment, the non-coordinating anion activator is represented by the following formula: $(Z)^{d+}(A^{d-})$, wherein Z is (L-H) or a reducible Lewis acid, L is a neutral Lewis base, H is hydrogen and $(L-H)^+$ is a Brønsted acid; $A^{d-}$ is a non-coordinating anion having the charge d−; and d is an integer from 1 to 3.

When Z is (L-H) such that the cation component is $(L-H)^{d+}$, the cation component may include Brønsted acids such as protonated Lewis bases capable of protonating a moiety, such as an alkyl or aryl, from the catalyst precursor, resulting in a cationic transition metal species, or the activating cation $(L-H)^{d+}$ is a Brønsted acid, capable of donating a proton to the catalyst precursor resulting in a transition metal cation, including ammoniums, oxoniums, phosphoniums, silyliums, and mixtures thereof, or ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid, it may be represented by the formula: $(Ar_3C+)$, where Ar is aryl or aryl substituted with a heteroatom, or a $C_1$ to $C_{40}$ hydrocarbyl, the reducible Lewis acid may be represented by the formula: $(Ph_3C+)$, where Ph is phenyl or phenyl substituted with a heteroatom, and/or a $C_1$ to $C_{40}$ hydrocarbyl. In some examples, the reducible Lewis acid is triphenyl carbenium.

Embodiments of the anion component $A^{d-}$ include those having the formula $[M^k+Q^n]^{d-}$ wherein k is 1, 2, or 3; n is 1, 2, 3, 4, 5 or 6, or 3, 4, 5 or 6; n−k=d; M is an element selected from Group 13 of the Periodic Table of the Elements, or boron or aluminum, and Q is independently a hydride, bridged or unbridged dialkylamido, halide, alkoxide, aryloxide, hydrocarbyls, the Q having up to 20 carbon atoms with the proviso that in not more than one occurrence is Q a halide, and two Q groups may form a ring structure. Each Q may be a fluorinated hydrocarbyl having 1 to 20 carbon atoms, or each Q is a fluorinated aryl radical, or each Q is a pentafluoryl aryl radical. Examples of suitable Ad− components also include diboron compounds as disclosed in U.S. Pat. No. 5,447,895, which is fully incorporated herein by reference.

In an embodiment in any of the NCA's represented by Formula 1 described above, the anion component Ad− is represented by the formula $[M^*k^*+Q^*n^*]d^*$— wherein $k^*$ is 1, 2, or 3; $n^*$ is 1, 2, 3, 4, 5, or 6 (or 1, 2, 3, or 4); $n^*-k^*=d^*$; $M^*$ is boron; and $Q^*$ is independently selected from hydride, bridged or unbridged dialkylamido, halogen, alkoxide, aryloxide, hydrocarbyls, the $Q^*$ having up to 20 carbon atoms with the proviso that in not more than 1 occurrence is $Q^*$ a halogen.

The present disclosure also provides a method to polymerize olefins including contacting olefins (such as propylene) with a catalyst complex as described above and an NCA activator represented by the following formula: $R_nM^{}(ArNHal)^{4-n}$, where R is a monoanionic ligand; $M^{}$ is a Group 13 metal or metalloid; ArNHal is a halogenated, nitrogen-containing aromatic ring, polycyclic aromatic ring, or aromatic ring assembly in which two or more rings (or fused ring systems) are joined directly to one another or together; and n is 0, 1, 2, or 3. Typically the NCA containing an anion of Formula 2 also contains a suitable cation that is essentially non-interfering with the ionic catalyst complexes formed with the transition metal compounds, or the cation is $Zd^+$ as described above.

In one or more embodiments, in any of the NCA's containing an anion represented by Formula (II) described above, R is a $C_1$ to $C_{30}$ hydrocarbyl. In an embodiment, $C_1$ to $C_{30}$ hydrocarbyls are substituted with one or more $C_1$ to $C_{20}$ hydrocarbyls, halide, hydrocarbyl substituted organometalloid, dialkylamido, alkoxy, aryloxy, alkysulfido, arylsulfido, alkylphosphido, arylphosphide, or other anionic substituent; fluoride; bulky alkoxides, where bulky means $C_4$ to $C_{20}$ hydrocarbyls; —SRa, —NRa$_2$, and —PRa$_2$, where each Ra is independently a monovalent $C_4$ to $C_{20}$ hydrocarbyl having a molecular volume greater than or equal to the molecular volume of an isopropyl substitution or a $C_4$ to $C_{20}$ hydrocarbyl substituted organometalloid having a molecular volume greater than or equal to the molecular volume of an isopropyl substitution.

In one or more embodiments, in any of the NCA's containing an anion represented by Formula (II) described above, the NCA also includes cation containing a reducible Lewis acid represented by the formula: $(Ar_3C+)$, where Ar is aryl or aryl substituted with a heteroatom, and/or a $C_1$ to $C_{40}$ hydrocarbyl, or the reducible Lewis acid represented by the formula: ($Ph_3C+$), where Ph is phenyl or phenyl substituted with one or more heteroatoms, and/or $C_1$ to $C_{40}$ hydrocarbyls.

In one or more embodiments in any of the NCA's containing an anion represented by Formula (II) described above, the NCA may also contain a cation represented by the formula, $(L-H)^{d+}$, wherein L is an neutral Lewis base; H is hydrogen; (L-H) is a Brønsted acid; and d is 1, 2, or 3, or $(L-H)^{d+}$ is a Brønsted acid selected from ammoniums, oxoniums, phosphoniums, siliyliums, and mixtures thereof.

Further examples of useful activators include those disclosed in U.S. Pat. Nos. 7,297,653 and 7,799,879, which are fully incorporated by reference herein.

In one or more embodiments, an activator can be or include a salt of a cationic oxidizing agent and a noncoordinating, compatible anion represented by the following formula: $(OX^{e+})_d (A^{d-})_e$, wherein $OX^{e+}$ is a cationic oxidizing agent having a charge of e+; e is 1, 2, or 3; d is 1, 2, or 3; and $A^{d-}$ is a non-coordinating anion having the charge of d− (as further described above). Examples of cationic oxidizing agents include: ferrocenium, hydrocarbyl-substituted ferrocenium, $Ag^+$, or $Pb^{+2}$. Suitable embodiments of $A^{d-}$ include tetrakis(pentafluorophenyl)borate.

Activators useful in catalyst systems can be or include one or more of: trimethylammonium tetrakis(perfluoronaphthyl)borate, N,N-dimethylanilinium tetrakis(perfluoronaphthyl)borate, N,N-diethylanilinium tetrakis(perfluoronaphthyl)borate, triphenylcarbenium tetrakis(perfluoronaphthyl)borate, trimethylammonium tetrakis(perfluorobiphenyl)borate, N,N-dimethylanilinium tetrakis(perfluorobiphenyl)borate, triphenylcarbenium tetrakis(perfluorobiphenyl)borate, and the types disclosed in U.S. Pat. No. 7,297,653, which is fully incorporated by reference herein.

Suitable activators also include: N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Ph_3C^+][B(C_6F_5)_4^-]$, $[Me_3NH^+][B(C_6F_5)_4^-]$; 1-(4- (tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In one or more embodiments, the activator can be or include one or more of a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In one or more embodiments, an activator can be or include one or more of N,N-dimethylanilinium tetra(perfluorophenyl)borate; N,N-dimethylanilinium tetrakis(perfluoronaphthyl)borate; N,N-dimethylanilinium tetrakis(perfluorobiphenyl)borate; N,N-dimethylanilinium tetrakis(3,5-bis(trifluoromethyl)phenyl)borate; triphenylcarbenium tetrakis(perfluoronaphthyl)borate; triphenylcarbenium tetrakis(perfluorobiphenyl)borate; triphenylcarbenium tetrakis(3,5-bis(trifluoromethyl)phenyl)borate; triphenylcarbenium tetra(perfluorophenyl)borate; trimethylammonium tetra(perfluorophenyl)borate; triethylammonium tetrakis(perfluoronaphthyl)borate; tripropylammonium tetrakis(perfluoronaphthyl)borate; tri(n-butyl)ammonium tetrakis(perfluoronaphthyl)borate; tri(t-butyl)ammonium tetrakis(perfluoronaphthyl)borate; N,N-diethylanilinium tetrakis(perfluoronaphthyl)borate; N,N-dimethyl-(2,4,6-trimethylanilinium) tetrakis(perfluoronaphthyl)borate; and tropillium tetrakis(perfluoronaphthyl)borate.

In one or more embodiments, two NCA activators may be used in the polymerization and the molar ratio of the first NCA activator to the second NCA activator can be any ratio. In one or more embodiments, the molar ratio of the first NCA activator to the second NCA activator is 0.01:1 to 10,000:1, or 0.1:1 to 1,000:1, or 1:1 to 100:1.

In some embodiments, the NCA activator-to-catalyst ratio is a 1:1 molar ratio, or 0.1:1 to 100:1, or 0.5:1 to 200:1, or 1:1 to 500:1 or 1:1 to 1,000:1. In one or more embodiments, the NCA activator-to-catalyst ratio is 0.5:1 to 10:1, or 1:1 to 5:1.

In one or more embodiments, the transition metal complex or catalysts can be combined with combinations of alumoxanes and NCA's (see for example, U.S. Pat. Nos. 5,153,157, 5,453,410, EP 0 573 120 B1, WO 1994/007928, and WO 1995/014044 which discuss the use of an alumoxane in combination with an ionizing activator, all of which are incorporated by reference herein).

In some embodiments, when an NCA (such as an ionic or neutral stoichiometric activator) is used, the catalyst-to-activator molar ratio is typically from 1:10 to 1:1; 1:10 to 10:1; 1:10 to 2:1; 1:10 to 3:1; 1:10 to 5:1; 1:2 to 1.2:1; 1:2 to 10:1; 1:2 to 2:1; 1:2 to 3:1; 1:2 to 5:1; 1:3 to 1.2:1; 1:3 to 10:1; 1:3 to 2:1; 1:3 to 3:1; 1:3 to 5:1; 1:5 to 1:1; 1:5 to 10:1; 1:5 to 2:1; 1:5 to 3:1; 1:5 to 5:1; or 1:1 to 1:1.2.

Likewise, a co-activator, such as a group 1, 2, or 13 organometallic species (e.g., an alkyl aluminum compound such as tri-n-octyl aluminum), may be used in the catalyst system herein. The catalyst-to-co-activator molar ratio is from 1:100 to 100:1; 1:75 to 75:1; 1:50 to 50:1; 1:25 to 25:1; 1:15 to 15:1; 1:10 to 10:1; 1:5 to 5:1; 1:2 to 2:1; 1:100 to 1:1; 1:75 to 1:1; 1:50 to 1:1; 1:25 to 1:1; 1:15 to 1:1; 1:10 to 1:1; 1:5 to 1:1; 1:2 to 1:1; or 1:10 to 2:1.

Support Materials

In embodiments herein, the catalyst system can include an inert support material. In one or more embodiments, the supported material is a porous support material, for example, talc, or inorganic oxides. Other support materials include zeolites, clays, organoclays, or any other suitable organic or inorganic support material and the like, or mixtures thereof.

In one or more embodiments, the support material is an inorganic oxide. Suitable inorganic oxide materials for use in transition metal catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, functionalized polyolefins, such as polyethylene. Supports include magnesia, titania, zirconia, montmorillonite, phyllosilicate, zeolites, talc, clays, and the like. Also, combinations of these support materials may be used, for example, silica-chromium, silica-alumina, silica-titania, and the like. Support materials can be or include, but are not limited to $Al_2O_3$, $ZrO_2$, $SiO_2$, $SiO_2/Al_2O_3$, $SiO_2/TiO_2$, silica clay, silicon oxide/clay, or any mixture thereof.

The support material, such as an inorganic oxide, can have a surface area in the range from about 10 $m^2/g$ to about 700 $m^2/g$, pore volume in the range from about 0.1 cc/g to about 4.0 cc/g and average particle size in the range from about 5 µm to about 500 µm. In one or more embodiments, the surface area of the support material is in the range from about 50 m²/g to about 500 m²/g, pore volume of from about 0.5 cc/g to about 3.5 cc/g and average particle size of from about 10 μm to about 200 μm. In one or more embodiments, the surface area of the support material is in the range is from about 100 m²/g to about 400 m²/g, pore volume from about 0.8 cc/g to about 3.0 cc/g and average particle size is from about 5 μm to about 100 μm. The average pore size of the support material useful in the present disclosure is in the range from about 10 Å to about 1,000 Å, such as about 50 Å to about 500 Å, such as about 75 Å to about 350 Å. In some embodiments, the support material is a high surface area, amorphous silica (surface area=about 300 m²/gm; pore volume of about 1.65 cm³/gm). Silicas are marketed under the tradenames of DAVISON 952 silica or DAVISON 955 silica by the Davison Chemical Division of W.R. Grace and Company. In other embodiments, DAVISON 948 silica is used as a support material.

The support material should be dry, that is, substantially free of absorbed water. Drying of the support material can be effected by heating or calcining at about 100° C. to about 1,000° C., such as at least about 600° C. When the support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material should have at least some reactive hydroxyl (OH) groups to produce supported catalyst systems of the present disclosure. The calcined support material is then contacted with at least one polymerization catalyst containing one or more transition metal catalyst and an activator.

The support material, having reactive surface groups, typically hydroxyl groups, is slurried in a non-polar solvent and the resulting slurry is contacted with a solution of a transition metal catalyst and an activator. In some embodiments, the slurry of the support material is first contacted with the activator for a period of time in the range from about 0.5 hours to about 24 hours, from about 2 hours to about 16 hours, or from about 4 hours to about 8 hours. The solution of the transition metal complex or catalyst is then contacted with the isolated support/activator. In some embodiments, the supported catalyst system is generated in situ. In one or more embodiments, the slurry of the support material is first contacted with the catalyst compound for a period of time in the range from about 0.5 hours to about 24 hours, from about 2 hours to about 16 hours, or from about 4 hours to about 8 hours. The slurry of the supported transition metal catalyst is then contacted with the activator solution.

The mixture of the catalyst, activator and support is heated to about 0° C. to about 70° C., such as to about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants used herein, e.g., the activator, and the catalyst compound, are at least partially soluble and which are liquid at room temperature. Non-limiting example non-polar solvents are alkanes, such as isopentane, hexane, n-heptane, octane, nonane, and decane, cycloalkanes, such as cyclohexane, aromatics, such as benzene, toluene, and ethylbenzene.

In one or more embodiments, the support material contains a support material treated with an electron-withdrawing anion. The support material can be silica, alumina, silica-alumina, silica-zirconia, alumina-zirconia, aluminum phosphate, heteropolytungstates, titania, magnesia, boria, zinc oxide, mixed oxides thereof, or mixtures thereof and the electron-withdrawing anion is selected from fluoride, chloride, bromide, phosphate, triflate, bisulfate, sulfate, or any combination thereof.

The electron-withdrawing component used to treat the support material can be any component that increases the Lewis or Brønsted acidity of the support material upon treatment (as compared to the support material that is not treated with at least one electron-withdrawing anion). In one or more embodiments, the electron-withdrawing component is an electron-withdrawing anion derived from a salt, an acid, or other compound, such as a volatile organic compound, that serves as a source or precursor for that anion. Electron-withdrawing anions can be sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or mixtures thereof, or combinations thereof. An electron-withdrawing anion can be fluoride, chloride, bromide, phosphate, triflate, bisulfate, or sulfate, or any combination thereof, at least one embodiment of this disclosure. In one or more embodiments, the electron-withdrawing anion is sulfate, bisulfate, fluoride, chloride, bromide, iodide, fluorosulfate, fluoroborate, phosphate, fluorophosphate, trifluoroacetate, triflate, fluorozirconate, fluorotitanate, or combinations thereof.

Thus, for example, the support material suitable for use in the catalyst systems of the present disclosure can be one or more of fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or combinations thereof. In one or more embodiments, the activator-support can be or include fluorided alumina, sulfated alumina, fluorided silica-alumina, sulfated silica-alumina, fluorided silica-coated alumina, sulfated silica-coated alumina, phosphated silica-coated alumina, or combinations thereof. In another embodiment, the support material includes alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, or combinations thereof. Further, any of these activator-supports optionally can be treated with a metal ion.

Nonlimiting examples of cations suitable for use in the present disclosure in the salt of the electron-withdrawing anion include ammonium, trialkyl ammonium, tetraalkyl ammonium, tetraalkyl phosphonium, $H^+$, $[H(OEt_2)_2]^+$, or combinations thereof.

Further, combinations of one or more different electron-withdrawing anions, in varying proportions, can be used to tailor the specific acidity of the support material to a desired level. Combinations of electron-withdrawing components can be contacted with the support material simultaneously or individually, and in any order that provides a desired chemically-treated support material acidity. For example, in one or more embodiments, two or more electron-withdrawing anion source compounds in two or more separate contacting steps.

In one or more embodiments, a process by which a chemically-treated support material is prepared can include contacting a selected support material, or combination of support materials, with a first electron-withdrawing anion source compound to form a first mixture; such first mixture can be calcined and then contacted with a second electron-withdrawing anion source compound to form a second mixture; the second mixture can then be calcined to form a treated support material. In such a process, the first and second electron-withdrawing anion source compounds can be either the same or different compounds.

The method by which the oxide is contacted with the electron-withdrawing component, typically a salt or an acid of an electron-withdrawing anion, can include gelling, co-gelling, impregnation of one compound onto another, or combinations thereof. Following a contacting method, the contacted mixture of the support material, electron-withdrawing anion, and optional metal ion, can be calcined.

According to another embodiment of the present disclosure, the support material can be treated by a process that includes: (i) contacting a support material with a first electron-withdrawing anion source compound to form a first mixture; (ii) calcining the first mixture to produce a calcined first mixture; (iii) contacting the calcined first mixture with a second electron-withdrawing anion source compound to form a second mixture; and (iv) calcining the second mixture to form the treated support material.

Polymerization Processes

In embodiments herein, the present disclosure provides polymerization processes where monomers (e.g., ethylene or propylene), comonomers (e.g., ethylene and propylene), or terpolymers (e.g., ethylene, propylene, and one or more other cyclic dienes, such as endocyclic alkenes and/or vinyls) are contacted with a catalyst system containing one or more transition metal catalysts and one or more activators, as described above. The catalyst compound and activator may be combined in any order, and are combined typically prior to contacting with the monomer.

In one or more embodiments, a polymerization process includes a) contacting one or more olefin monomers with a catalyst system containing: i) an activator and ii) a catalyst compound. The activator may be an alumoxane or a non-coordination anion activator. The one or more olefin monomers can be or include, but are not limited to, ethylene, propylene, butylene, or any combination thereof. The polymerization process further includes heating the one or more olefin monomers and the catalyst system to 70° C. or more to form polyethylene, polypropylene, or a copolymer or terpolymers containing both polyethylene and polypropylene.

Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene, and isomers thereof. In one or more embodiments, the monomer contains ethylene and an optional comonomer containing one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In one or more embodiments, the monomer contains ethylene and an optional comonomer containing one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, ethylidene norbornene, and dicyclopentadiene.

Diolefin monomers include any hydrocarbon structure, such as $C_4$ to $C_{30}$, having at least two unsaturated bonds, wherein at least two of the unsaturated bonds are readily incorporated into a polymer by either a stereospecific or a non-stereospecific catalyst(s). The diolefin monomers can be selected from alpha, omega-diene monomers (e.g., di-vinyl monomers). The diolefin monomers are linear di-vinyl monomers, such as those containing from 4 carbon atoms to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1,000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes and slurry processes can be performed. For example, a homogeneous polymerization process is one where at least 90 wt % of the product is soluble in the reaction media. A bulk homogeneous process can be used. For example, a bulk process is one where monomer concentration in all feeds to the reactor is 70 volume % or more. Alternately, no solvent or diluent is present or added in the reaction medium, (except for the small amounts used as the carrier for the catalyst system or other additives, or amounts typically found with the monomer; e.g., propane in propylene). In one or more embodiments, the process is a slurry polymerization process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$-$C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In one or more embodiments, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In one or more embodiments, the solvent is not aromatic, such that aromatics are present in the solvent at less than 1 wt %, such as less than 0.5 wt %, such as less than 0 wt % based upon the weight of the solvents.

In one or more embodiments, the feed concentration of the monomers and comonomers for the polymerization is 60 vol % solvent or less, such as 40 vol % or less, such as 20 vol % or less, based on the total volume of the feedstream. The polymerization can be performed in a bulk process.

In one or more examples, the catalyst of the present disclosure is contacted with ethylene, propylene, and one or more cyclic dienes, including vinyls and/or endocyclic alkenes, to produce terpolymers. The ethylene, propylene, and one or more cyclic dienes (e.g., VBN, ENB, and/or DCPD), can be combined in specified ratios or amounts to produce a mixture that is contacted with the catalyst.

The mixture of olefin monomers can have a weight ratio of the ethylene to the cyclic diene of about 10:1, about 20:1, about 30:1, about 40:1, about 50:1, about 60:1, or about 70:1 to about 80:1, about 90:1, about 100:1, about 150:1, about 200:1, about 300:1, about 400:1, about 500:1, about 600:1, about 800:1, or about 1,000:1. For example, the mixture of olefin monomers can have a weight ratio of the ethylene to the cyclic diene of about 20:1 to about 500:1, about 20:1 to about 300:1, about 20:1 to about 200:1, about 20:1 to about 100:1, about 20:1 to about 80:1, about 40:1 to about 500:1, about 40:1 to about 300:1, about 40:1 to about 200:1, about 40:1 to about 100:1, about 40:1 to about 80:1, about 50:1 to about 500:1, about 50:1 to about 300:1, about 50:1 to about 200:1, about 50:1 to about 100:1, about 50:1 to about 80:1, about 60:1 to about 500:1, about 60:1 to about 300:1, about 60:1 to about 200:1, about 60:1 to about 100:1, or about 60:1 to about 80:1.

The mixture of olefin monomers can have a weight ratio of the propylene to the cyclic diene of about 50:1, about 100:1, about 150:1, about 200:1, about 250:1, about 300:1, about 320:1, or about 340:1 to about 350:1, about 380:1, about 400:1, about 450:1, about 500:1, about 550:1, about 600:1, about 700:1, about 800:1, about 900:1, about 1,000:1, about 1,200:1, about 1,500:1, or about 2,000:1. For example, the mixture of olefin monomers can have a weight ratio of the propylene to the cyclic diene of about 50:1 to about 2,000:1, about 100:1 to about 2,000:1, about 100:1 to about 1,500:1, about 100:1 to about 1,200:1, about 100:1 to about 1,000:1, about 100:1 to about 800:1, about 100:1 to about 500:1, about 100:1 to about 400:1, about 100:1 to about 350:1, about 100:1 to about 300:1, about 200:1 to about 2,000:1, about 200:1 to about 1,500:1, about 200:1 to about 1,200:1, about 200:1 to about 1,000:1, about 200:1 to about 800:1, about 200:1 to about 500:1, about 200:1 to about 400:1, about 200:1 to about 350:1, about 200:1 to about 300:1, about 300:1 to about 2,000:1, about 300:1 to about 1,500:1, about 300:1 to about 1,200:1, about 300:1 to about 1,000:1, about 300:1 to about 800:1, about 300:1 to about 500:1, about 300:1 to about 400:1, about 300:1 to about 350:1, about 300:1 to about 325:1, about 320:1 to about 2,000:1, about 320:1 to about 1,500:1, about 320:1 to about 1,200:1, about 320:1 to about 1,000:1, about 320:1 to about 800:1, about 320:1 to about 500:1, about 320:1 to about 400:1, or about 320:1 to about 350:1.

The mixture of olefin monomers can have a weight ratio of the propylene to the ethylene of about 0.5:1, about 1:1, about 2:1, about 3:1, about 4:1, or about 5:1 to about 6:1 about 7:1, about 8:1, about 9:1, about 10:1, about 12:1, about 15:1, about 20:1, about 25:1, about 30:1, about 40:1, about 50:1, or about 60:1. For example, the mixture of olefin monomers can have a weight ratio of the propylene to the ethylene of about 0.5:1 to about 60:1, about 1:1 to about 50:1, about 1:1 to about 40:1, about 1:1 to about 30:1, about 1:1 to about 20:1, about 1:1 to about 10:1, about 1:1 to about 8:1, about 1:1 to about 7:1, about 1:1 to about 6:1, about 1:1 to about 5:1, about 2:1 to about 50:1, about 2:1 to about 40:1, about 2:1 to about 30:1, about 2:1 to about 20:1, about 2:1 to about 10:1, about 2:1 to about 8:1, about 2:1 to about 7:1, about 2:1 to about 6:1, about 2:1 to about 5:1, about 3:1 to about 50:1, about 3:1 to about 40:1, about 3:1 to about 30:1, about 3:1 to about 20:1, about 3:1 to about 10:1, about 3:1 to about 8:1, about 3:1 to about 7:1, about 3:1 to about 6:1, about 3:1 to about 5:1, about 4:1 to about 50:1, about 4:1 to about 40:1, about 4:1 to about 30:1, about 4:1 to about 20:1, about 4:1 to about 10:1, about 4:1 to about 8:1, about 4:1 to about 7:1, about 4:1 to about 6:1, or about 4:1 to about 5:1.

In one or more examples, the mixture of olefin monomers can have a weight ratio of the ethylene to the cyclic diene of about 20:1 to about 500:1; a weight ratio of the propylene to the cyclic diene of about 100:1 to about 1,000:1; and a weight ratio of the propylene to the ethylene of about 1:1 to about 40:1. In some examples, the mixture of olefin monomers can have a weight ratio of the ethylene to the cyclic diene of about 40:1 to about 200:1, a weight ratio of the propylene to the cyclic diene of about 200:1 to about 500:1, and a weight ratio of the propylene to the ethylene of about 2:1 to about 10:1. In other examples, the mixture of olefin monomers can have a weight ratio of the ethylene to the cyclic diene of about 50:1 to about 100:1, a weight ratio of the propylene to the cyclic diene of about 300:1 to about 400:1, and a weight ratio of the propylene to the ethylene of about 3:1 to about 7:1. In further examples, the mixture of olefin monomers can have a weight ratio of the ethylene to the cyclic diene of about 60:1 to about 80:1, a weight ratio of the propylene to the cyclic diene of about 320:1 to about 350:1, and a weight ratio of the propylene to the ethylene of about 4:1 to about 6:1. For example, ethylene, propylene, and VBN are combined to produce a mixture containing a weight ratio of the ethylene to the VBN of about 40:1 to about 200:1, a weight ratio of the propylene to the VBN of about 200:1 to about 500:1, and a weight ratio of the propylene to the ethylene of about 2:1 to about 10:1.

Polymerizations can be performed at any temperature and/or pressure suitable to obtain the desired polymers, such as ethylene and or propylene polymers. Typical temperatures and/or pressures include a temperature in the range from about 0° C. to about 300° C., such as about 20° C. to about 200° C., such as about 35° C. to about 150° C., such as about 40° C. to about 120° C., such as about 45° C. to about 80° C., for example about 74° C., and at a pressure in the range from about 0.35 MPa to about 10 MPa, such as about 0.45 MPa to about 6 MPa, such as about 0.5 MPa to about 4 MPa.

In a typical polymerization, the run time of the reaction is up to 300 minutes, such as in the range from about 5 minutes to about 250 minutes, such as about 10 minutes to about 120 minutes.

In one or more embodiments, hydrogen is present in the polymerization reactor at a partial pressure of about 0.001 psig to about 50 psig (about 0.007 kPa to about 345 kPa), such as from about 0.01 psig to about 25 psig (about 0.07 kPa to about 172 kPa), such as about 0.1 psig to about 10 psig (about 0.7 kPa to about 70 kPa).

In one or more embodiments, the productivity of a catalyst of the present disclosure is from about 1,000 gPgcat$^{-1}$ hr$^{-1}$ to about 100,000 gPgcat$^{-1}$ hr$^{-1}$, such as from about 2,000 gPgcat$^{-1}$ hr$^{-1}$ to about 75,000 gPgcat$^{-1}$ hr$^{-1}$, such as from about 4,000 gPgcat$^{-1}$ hr$^{-1}$ to about 50,000 gPgcat$^{-1}$ hr$^{-1}$.

In one or more embodiments, the catalyst system, the transition metal complex, and/or the catalyst has a catalytic activity of about 10 kg/mmol-hr, about 20 kg/mmol-hr, about 40 kg/mmol-hr, about 50 kg/mmol-hr, about 70 kg/mmol-hr, about 80 kg/mmol-hr, about 90 kg/mmol-hr, or about 100 kg/mmol-hr to about 120 kg/mmol-hr, about 150 kg/mmol-hr, about 180 kg/mmol-hr, about 250 kg/mmol-hr, about 300 kg/mmol-hr, about 500 kg/mmol-hr, about 600 kg/mmol-hr, about 800 kg/mmol-hr, about 1,000 kg/mmol-hr, about 1,200 kg/mmol-hr, about 1,500 kg/mmol-hr, about 2,000 kg/mmol-hr, or greater. For example, the catalyst system, the transition metal complex, and/or the catalyst has a catalytic activity of about 10 kg/mmol-hr to about 2,000 kg/mmol-hr, about 50 kg/mmol-hr to about 1,500 kg/mmol-hr, about 50 kg/mmol-hr to about 1,000 kg/mmol-hr, about 50 kg/mmol-hr to about 800 kg/mmol-hr, about 50 kg/mmol-hr to about 700 kg/mmol-hr, about 50 kg/mmol-hr to about 600 kg/mmol-hr, about 50 kg/mmol-hr to about 500 kg/mmol-hr, about 50 kg/mmol-hr to about 400 kg/mmol-hr, about 50 kg/mmol-hr to about 300 kg/mmol-hr, about 100 kg/mmol-hr to about 1,500 kg/mmol-hr, about 100 kg/mmol-hr to about 800 kg/mmol-hr, about 100 kg/mmol-hr to about 700 kg/mmol-hr, about 400 kg/mmol-hr to about 1,500 kg/mmol-hr, about 400 kg/mmol-hr to about 1,000 kg/mmol-hr, or about 400 kg/mmol-hr to about 800 kg/mmol-hr.

In one or more embodiments, the conversion of olefin monomer is at least 10%, based upon polymer yield and the weight of the monomer entering the reaction zone, such as 20% or more, such as 30% or more, such as 50% or more, such as 80% or more. In one or more embodiments, a catalyst of the present disclosure has an activity of 150,000 to about 600,000 g/mmol/hour.

In some embodiments, a catalyst of the present disclosure, such as any one or more compounds represented by Formulas (I), (IV), (V), (VI), (VII), and (VIII), is capable of producing an olefin polymer, such as a terpolymer (e.g., EPDM) with no or substantially no gelling. The recovery or conversion of monomers to the polymer product (e.g., olefin terpolymer) is greater than 90 wt %, greater than 92 wt %, greater than 95 wt %, greater than 96 wt %, greater than 97 wt %, greater than 98 wt %, greater than 99 wt %, greater than 99.5 wt %, or greater with no or substantially no gelling. As used herein, "conversion" means the amount of monomer (wt %) that is converted to polymer product and therefore is calculated based on the yield of the polymer product over the sum of the amounts of monomer fed into the reactor.

Preferably, the recovery or conversion of the diene monomers to the polymer product (e.g., olefin terpolymer) is greater than 90 wt %, greater than 92 wt %, greater than 95 wt %, greater than 96 wt %, greater than 97 wt %, greater than 98 wt %, greater than 99 wt %, greater than 99.5 wt %, or greater preferably with no or substantially no gelling, where conversion of diene monomers means the amount of diene monomer (wt %) that is converted to polymer product and therefore is calculated based on the amount of diene in the polymer product over the sum of the amounts of diene monomer fed into the reactor.

In one or more embodiments, little or no alumoxane is used in the process to produce the polymers. Alumoxane can be present at zero mol %, alternatively the alumoxane is present at a molar ratio of aluminum to transition metal less than 500:1, such as less than 300:1, such as less than 100:1, such as less than 1:1.

In some embodiments, little or no scavenger is used in the process to produce the ethylene polymer. Scavenger (such as trialkyl aluminum) can be present at zero mol %, alternately the scavenger is present at a molar ratio of scavenger metal to transition metal of less than 100:1, such as less than 50:1, such as less than 15:1, such as less than 10:1.

In one or more embodiments, the polymerization: 1) is conducted at temperatures of about 0° C. to about 300° C. (such as about 25° C. to about 150° C., such as about 40° C. to about 120° C., such as about 70° C. to about 110° C.); 2) is conducted at a pressure of atmospheric pressure to 10 MPa (such as about 0.35 MPa to about 10 MPa, such as from about 0.45 MPa to about 6 MPa, such as from about 0.5 MPa to about 4 MPa); 3) is conducted in an aliphatic hydrocarbon solvent (such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof, where aromatics are present in the solvent at less than 1 wt %, such as less than 0.5 wt %, such as at 0 wt % based upon the weight of the solvents); and 4) the activity of the catalyst compound is at least 40,000 g/mmol-hr, such about 150,000 g/mmol-hr, about 200,000 g/mmol-hr, about 250,000 g/mmol-hr, about 300,000 g/mmol-hr, or greater. In one or more embodiments, the catalyst system used in the polymerization includes no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In one or more embodiments, the polymerization occurs in one reaction zone.

Other additives may also be used in the polymerization, as desired, such as one or more scavengers, promoters, modifiers, chain transfer agents (such as diethyl zinc), reducing agents, oxidizing agents, hydrogen, aluminum alkyls, or silanes.

Chain Transfer Agent

A "chain transfer agent" (CTA) is any agent capable of hydrocarbyl and/or polymeryl group exchange between a coordinative polymerization catalyst and the metal center of the chain transfer agent during a polymerization process. The chain transfer agent can be any desirable chemical compound such as those disclosed in WO 2007/130306. The chain transfer agent can be selected from Group 2, 12, or 13 alkyl or aryl compounds, such as zinc, magnesium, or aluminum alkyls or aryls. In some examples, the alkyl is a $C_1$-$C_{30}$ alkyl, a $C_2$-$C_{20}$ alkyl, or a $C_3$-$C_{12}$ alkyl. Exemplary alkyls for the CTA can be or include, but are not limited to, methyl, ethyl, propyl, butyl, isobutyl, tertbutyl, pentyl, hexyl, cyclohexyl, phenyl, octyl, nonyl, decyl, undecyl, dodecyl, isomers thereof, or any combination thereof.

In one or more examples, the chain transfer agent is selected from dialkyl zinc compounds, where the alkyl is independently selected from methyl, ethyl, propyl, butyl, isobutyl, tertbutyl, pentyl, hexyl, cyclohexyl, and phenyl. In some examples, the chain transfer agent is selected from trialkyl aluminum compounds, where the alkyl is independently selected from methyl, ethyl, propyl, butyl, isobutyl, tertbutyl, pentyl, hexyl, and cyclohexyl. In other examples, the chain transfer agent is selected from tri aryl aluminum compounds where the aryl is selected from phenyl and substituted phenyl.

The inventive process may be characterized by the transfer of at least 0.5 polymer chains (e.g., 0.5 to 3) polymer chains, where n is the maximum number of polymer chains that can be transferred to the chain transfer agent metal, such as n is 1 to 3 for trivalent metals (such as Al) and 1 to 2 for divalent metals (such as Zn), such as n is 1.5 to 3 for trivalent metals (such as Al) and 1.5-2 for divalent metals (such as Zn). The number of chains transferred per metal is the slope of the plot of moles of polymer produced versus the moles of the chain transfer agent metal (as determined from at least four points, CTA metal:catalyst transition metal of 20:1, 80:1, 140:1 and 200:1, using least squares fit (Microsoft™ Excel 2010, version 14.0.7113.5000 (32 bit)) to draw the line.

Useful chain transfer agents are typically present at from 10 or 20 or 50 or 100 equivalents to 600 or 700 or 800 or 1,000 or 2,000 or 4,000 equivalents relative to the catalyst component. Alternately the chain transfer agent is preset at a catalyst complex-to-CTA molar ratio of from about 1:12,000 to 10:1; alternatively 1:6,000; alternatively, 1:3,000 to 10:1; alternatively 1:2,000 to 10:1; alternatively 1:1,000 to 10:1; alternatively, 1:500 to 1:1; alternatively 1:300 to 1:1; alternatively 1:200 to 1:1; alternatively 1:100 to 1:1; alternatively 1:50 to 1:1; alternatively 1:10 to 1:1.

Exemplary chain transfer agents can be or include a compound represented by the formula $AlR_3$, $MgR_2$, or $ZnR_2$, where each R is, independently, a $C_1$-$C_8$ hydrocarbyl, such as methyl, ethyl, propyl, butyl, phenyl, hexyl, octyl, or an isomer thereof. Exemplary chain transfer agents can be or include, but are not limited to, diethylzinc, tri-n-octyl aluminum, trimethylaluminum, triethylaluminum, tri-isobutylaluminum, tri-n-hexylaluminum, trioctylaluminum, diethyl aluminum chloride, methyl alumoxane, dibutyl zinc, di-n-propylzinc, di-n-hexylzinc, di-n-pentylzinc, di-n-decylzinc, di-n-dodecylzinc, di-n-tetradecylzinc, di-n-hexadecylzinc, di-n-octadecylzinc, diphenylzinc, diisobutylaluminum hydride, diethylaluminum hydride, di-n-octylaluminum hydride, dibutylmagnesium, diethylmagnesium, dihexylmagnesium, triethylboron, or any combination thereof.

In other embodiments, two or more complexes are combined with diethyl zinc and/or tri-n-octylaluminum in the same reactor with monomer(s). Alternately, one or more complexes is/are combined with another catalyst and diethyl zinc and/or tri-n-octylaluminum in the same reactor with monomers.

In some embodiments, one or more complexes is/are combined with a mixture of diethyl zinc and an aluminum reagent in the same reactor with monomer(s). Alternately, one or more complexes is/are combined with two chain transfer agents in the same reactor with monomers.

Terpolymers and Other Olefin Polymeric Products

The present disclosure also provides compositions of matter which can be produced by the methods described herein. In one or more embodiments, a catalyst of the present disclosure, such as any one or more compounds represented by Formulas (I), (IV), (V), (VI), (VII), and (VIII), is capable of producing polymers or terpolymers, such as ethylene propylene diene monomer (EPDM). The EPDM contains ethylene, propylene, and one or more other dienes (e.g., a vinyl-containing diene, such as 5-vinyl-2-norbornene (VNB), 5-ethylidene-2-norbornene (ENB), dicyclopentadiene (DCPD), and/or others). These polymers are terpolymers and can be elastomers and/or rubbers. Exemplary polymers can be or include VNB-EPDM, ENB-EPDM, DCPD-EPDM, polymeric analogues thereof, or any combination thereof.

In one or more embodiments, a catalyst of the present disclosure, such as any one or more compounds represented by Formulas (I), (IV), (V), (VI), (VII), and (VIII), is capable of producing an olefin polymer, such as an olefin polymer (e.g., EPDM terpolymer), containing monomer units at the following weight ratios. The olefin polymer (e.g., EPDM terpolymer) has an ethylene content of about 30 wt %, about 40 wt %, about 45 wt %, about 50 wt %, about 55 wt %, about 60 wt %, or about 65 wt % to about 67 wt %, about 70 wt %, about 75 wt %, about 80 wt %, about 85 wt %, about 87 wt %, or about 90 wt %. For example, the olefin polymer has an ethylene content of about 30 wt % to about 90 wt %, about 30 wt % to about 85 wt %, about 40 wt % to about 85 wt %, about 50 wt % to about 85 wt %, about 55 wt % to about 85 wt %, about 60 wt % to about 85 wt %, about 62 wt % to about 85 wt %, about 30 wt % to about 75 wt %, about 40 wt % to about 75 wt %, about 50 wt % to about 75 wt %, about 55 wt % to about 75 wt %, about 60 wt % to about 75 wt %, about 62 wt % to about 75 wt %, about 30 wt % to about 70 wt %, about 40 wt % to about 70 wt %, about 50 wt % to about 70 wt %, about 55 wt % to about 70 wt %, about 60 wt % to about 70 wt %, about 62 wt % to about 70 wt %, about 30 wt % to about 67 wt %, about 40 wt % to about 67 wt %, about 50 wt % to about 67 wt %, about 55 wt % to about 67 wt %, about 60 wt % to about 67 wt %, or about 62 wt % to about 67 wt %.

The olefin polymer (e.g., EPDM terpolymer) has a propylene content of about 10 wt %, about 15 wt %, about 18 wt %, about 20 wt %, about 25 wt %, about 28 wt %, about 30 wt %, or about 32 wt % to about 35 wt %, about 38 wt %, about 40 wt %, about 45 wt %, about 50 wt %, about 55 wt %, or about 60 wt %. For examples, the olefin polymer has a propylene content of about 10 wt % to about 60 wt %, about 15 wt % to about 50 wt %, about 15 wt % to about 45 wt %, about 15 wt % to about 40 wt %, about 15 wt % to about 38 wt %, about 15 wt % to about 35 wt %, about 15 wt % to about 30 wt %, about 15 wt % to about 25 wt %, about 15 wt % to about 20 wt %, about 25 wt % to about 50 wt %, about 25 wt % to about 45 wt %, about 25 wt % to about 40 wt %, about 25 wt % to about 38 wt %, about 25 wt % to about 35 wt %, about 25 wt % to about 30 wt %, about 25 wt % to about 27 wt %, about 28 wt % to about 50 wt %, about 28 wt % to about 45 wt %, about 28 wt % to about 40 wt %, about 28 wt % to about 38 wt %, about 28 wt % to about 35 wt %, about 28 wt % to about 30 wt %, about 30 wt % to about 50 wt %, about 30 wt % to about 45 wt %, about 30 wt % to about 40 wt %, about 30 wt % to about 38 wt %, or about 30 wt % to about 35 wt %.

The olefin polymer (e.g., EPDM terpolymer) has a cyclic diene content of about 0.00001 wt %, about 0.001 wt %, about 0.01 wt %, about 0.05 wt %, about 0.1 wt %, about 0.2 wt %, about 0.25 wt %, about 0.3 wt %, about 0.35 wt %, about 0.4 wt %, about 0.45 wt %, about 0.5 wt %, or about 0.8 wt % to about 1 wt %, about 1.5 wt %, about 2 wt %, about 2.5 wt %, about 3 wt %, about 3.5 wt %, about 4 wt %, about 4.5 wt %, about 5 wt %, about 6 wt %, about 8 wt %, or about 10 wt %. For example, the olefin polymer has a cyclic diene content of about 0.001 wt % to about 10 wt %, about 0.05 wt % to about 5 wt %, about 0.1 wt % to about 5 wt %, about 0.15 wt % to about 5 wt %, about 0.2 wt % to about 5 wt %, about 0.25 wt % to about 5 wt %, about 0.3 wt % to about 5 wt %, about 0.35 wt % to about 5 wt %, about 0.4 wt % to about 5 wt %, about 0.45 wt % to about 5 wt %, about 0.5 wt % to about 5 wt %, about 0.8 wt % to about 5 wt %, about 1 wt % to about 5 wt %, about 0.05 wt % to about 3 wt %, about 0.1 wt % to about 3 wt %, about 0.15 wt % to about 3 wt %, about 0.2 wt % to about 3 wt %, about 0.25 wt % to about 3 wt %, about 0.3 wt % to about 3 wt %, about 0.35 wt % to about 3 wt %, about 0.4 wt % to about 3 wt %, about 0.45 wt % to about 3 wt %, about 0.5 wt % to about 3 wt %, about 0.8 wt % to about 3 wt %, about 1 wt % to about 3 wt %, about 0.05 wt % to about 2 wt %, about 0.1 wt % to about 2 wt %, about 0.15 wt % to about 2 wt %, about 0.2 wt % to about 2 wt %, about 0.25 wt % to about 2 wt %, about 0.3 wt % to about 2 wt %, about 0.35 wt % to about 2 wt %, about 0.4 wt % to about 2 wt %, about 0.45 wt % to about 2 wt %, about 0.5 wt % to about 2 wt %, about 0.8 wt % to about 2 wt %, about 1 wt % to about 2 wt %, about 0.05 wt % to about 1 wt %, about 0.1 wt % to about 1 wt %, about 0.15 wt % to about 1 wt %, about 0.2 wt % to about 1 wt %, about 0.25 wt % to about 1 wt %, about 0.3 wt % to about 1 wt %, about 0.35 wt % to about 1 wt %, about 0.4 wt % to about 1 wt %, about 0.45 wt % to about 1 wt %, about 0.5 wt % to about 1 wt %, or about 0.8 wt % to about 1 wt %.

In one or more examples, the olefin polymer (e.g., EPDM terpolymer) has an ethylene content of about 40 wt % to about 85 wt %, a propylene content of about 15 wt % to about 50 wt %, and a cyclic diene content of about 0.05 wt % to about 5 wt %. In some examples, the olefin polymer has an ethylene content of about 50 wt % to about 75 wt %, a propylene content of about 25 wt % to about 40 wt %, and a cyclic diene content of about 0.1 wt % to about 3 wt %. In other examples, the olefin polymer has an ethylene content of about 55 wt % to about 70 wt %, a propylene content of about 28 wt % to about 38 wt %, and a cyclic diene content of about 0.2 wt % to about 2 wt %. In further examples, the olefin polymer has an ethylene content of about 60 wt % to about 67 wt %, a propylene content of about 30 wt % to about 35 wt %, and a cyclic diene content of about 0.25 wt % to about 1 wt %.

In one or more embodiments, a catalyst of the present disclosure, such as any one or more compounds represented by Formulas (I), (IV), (V), (VI), (VII), and (VIII), is capable of producing olefin polymers, such as terpolymers (e.g., VNB-EPDM), having a g'$_{(vis)}$ value of greater than 0.90, greater than 0.93, greater than 0.95, greater than 0.96, greater than 0.965, greater than 0.97, greater than 0.972, greater than 0.973, greater than 0.975, greater than 0.977, greater than 0.98, greater than 0.985, greater than 0.99, greater than 0.995, greater than 0.997, greater than 0.998, greater than 0.999, or 1. For example, the olefin terpolymers produced herein have a g'$_{(vis)}$ value of greater than 0.90 to 1, about 0.95 to 1, about 0.96 to 1, about 0.97 to 1, 0.975 to 1, about 0.98 to 1, about 0.985 to 1, about 0.99 to 1, or about 0.95 to 1. Therefore, as indicated by having such a large g'$_{(vis)}$ values, the olefin terpolymers produced herein are substantially linear and have few, if any, long chain branches.

For purposes of this invention and the claims thereto, "no gelling" or "free of gels" means that 0.1 wt % or less of insoluble material is present and "substantially no gelling" or "substantially free of gels" means that 5 wt % of insoluble material is present after extraction in boiling xylene for 5 hours.

In one or more embodiments, the olefin polymers produced by the instant invention are not crosslinked or are not substantially crosslinked to an appreciable extent. That is, the so-called "gel content" of the olefin polymer is low, so that less than 50 wt %, less than 40 wt %, less than 30 wt %, less than 20 wt %, less than 10 wt %, less than 5 wt %, less than 3 wt %, less than 2 wt %, less than 1 wt %, less than 0.5 wt %, less than 0.1 wt %, or 0 wt % of the olefin polymer is insoluble after extraction in boiling xylene for 5 hours.

Alternately, in some embodiments, the olefin polymer has a gel content of less than about 5 wt %, less than 3 wt %, less than 2 wt %, less than 1 wt %, less than 0.5 wt %, less than 0.1 wt %, or 0 wt % after extraction in boiling toluene for 5 hours.

Alternately, in some embodiments, the olefin polymer has a gel content of less than about 5 wt %, less than 3 wt %, less than 2 wt %, less than 1 wt %, less than 0.5 wt %, less than 0.1 wt %, or 0 wt %, where the gel content is measured by determining the amount of material that is extractable from the olefin polymer by using cyclohexane or boiling xylene as an extractant. This method is disclosed in U.S. Pat. No. 4,311,628, which is incorporated herein by reference.

Mooney viscosity is a property used to monitor the quality of both natural and synthetic rubbers. It measures the resistance of rubber to flow at a relatively low shear rate. The olefin polymer has a Mooney viscosity ML (1+4) at 125° C. of about 20 Mooney Units (MU), about 25 MU, about 30 MU, about 35 MU, about 40 MU, about 42 MU, or about 45 MU to about 50 MU, about 60 MU, about 70 MU, about 80 MU, or about 100 MU. For example, the olefin polymer has a Mooney viscosity ML (1+4) at 125° C. of about 20 MU to about 100 MU, about 25 MU to about 90 MU, about 30 MU to about 80 MU, about 30 MU to about 60 MU, about 35 MU to about 55 MU, or about 40 MU to about 50 MU.

While the Mooney viscosity indicates the plasticity of the rubber, the Mooney relaxation area (MLRA) provides a certain indication of the effects of molecular weight distribution and elasticity of the rubber. The olefin polymer has an MLRA of about 50 MU, about 80 MU, about 90 MU, about 100 MU, about 110 MU, or about 120 MU to about 125 MU, about 130 MU, about 140 MU, about 150 MU, about 170 MU, about 185 MU, or about 200 MU. For example, the olefin polymer has an MLRA of about 50 MU to about 200 MU, about 80 MU to about 200 MU, about 100 MU to about 200 MU, about 110 MU to about 200 MU, about 120 MU to about 200 MU, about 80 MU to about 150 MU, about 100 MU to about 150 MU, about 110 MU to about 150 MU, about 120 MU to about 150 MU, about 80 MU to about 130 MU, about 100 MU to about 130 MU, about 110 MU to about 130 MU, or about 120 MU to about 130 MU.

Another indication of melt elasticity is the ratio of MLRA/ML (1+4). This ratio has the dimension of time and can be considered as a "relaxation time." A higher number signifies a higher degree of melt elasticity. Long chain branching will slow down the relaxation of the polymer chain, hence increasing the value of MLRA/ML (1+4). The olefin polymer has an MLRA/ML of greater than 1, such as about 1.5, about 1.7, about 2, about 2.2, about 2.5, or about 2.7 to about 2.8, about 2.9, about 3, about 3.2, about 3.5, about 4, or about 5. For example, the olefin polymer has an MLRA/ML of about 1.5 to about 5, about 2 to about 5, about 2.5 to about 5, about 2.7 to about 5, about 1.5 to about 4, about 2 to about 4, about 2.5 to about 4, about 2.7 to about 4, about 1.5 to about 3, about 2 to about 3, about 2.5 to about 3, or about 2.7 to about 3.

The olefin polymer has a cMLRA (at 80 ML) of about 100 MU, about 150 MU, about 200 MU, about 250 MU, about 275 MU, or about 300 MU to about 325 MU, about 350 MU, about 400 MU, about 450 MU, about 500 MU, or about 600 MU. For example, the olefin polymer has a cMLRA of about 100 MU to about 600 MU, about 150 MU to about 500 MU, about 150 MU to about 400 MU, about 150 MU to about 350 MU, about 150 MU to about 325 MU, about 150 MU to about 300 MU, about 200 MU to about 500 MU, about 200 MU to about 400 MU, about 200 MU to about 350 MU, about 200 MU to about 325 MU, about 200 MU to about 300 MU, about 250 MU to about 500 MU, about 250 MU to about 400 MU, about 250 MU to about 350 MU, about 250 MU to about 325 MU, or about 250 MU to about 300 MU.

Mooney viscosity and Mooney relaxation area are measured using a Mooney viscometer, operated at an average shear rate of about $2\ s^{-1}$ according to the following modified ASTM D1646: A square of sample is placed on either side of the rotor. The cavity is filled by pneumatically lowering the upper platen. The upper and lower platens are electrically heated and controlled at 125° C. The torque to turn the rotor at 2 rpm is measured by a torque transducer. The sample is preheated for 1 minute after the platens was closed. The motor is then started and the torque is recorded for a period of 4 minutes. Results are reported as ML (1+4) at 125° C., where M is Mooney viscosity number, L denotes the large rotor, "1" is the sample preheat time in minutes, "4" is the sample run time in minutes after the motor starts, and 125° C. is the test temperature.

The MLRA data is obtained from the Mooney viscosity measurement when the rubber relaxed after the rotor is stopped. The MLRA is the integrated area under the Mooney torque-relaxation time curve from 1 to 100 seconds. The MLRA can be regarded as a stored energy term which suggests that, after the removal of an applied strain, the longer or branched polymer chains can store more energy and require longer time to relax. Therefore, the MLRA value of a bimodal rubber (the presence of a discrete polymeric fraction with very high molecular weight and distinct composition) or a long chain branched rubber are larger than a broad or a narrow molecular weight rubber when compared at the same Mooney viscosity values.

Mooney viscosity values greater than about 100 cannot generally be measured using ML (1+4) at 125° C. In this event, a higher temperature is used (e.g., 150° C.), with eventual longer shearing time (e.g., 1+8 at 125° C. or 150° C.), but more preferably, the Mooney measurement is carried out using a non-standard small rotor as described below. The non-standard rotor design is employed with a change in Mooney scale that allows the same instrumentation on the Mooney machine to be used with higher Mooney rubbers. This rotor is termed MST, Mooney Small Thin, in contrast with ML.

In one or more embodiments, a catalyst of the present disclosure, such as any one or more compounds represented by Formulas (I), (IV), (V), (VI), (VII), and (VIII), is capable of producing an olefin polymer, such as a terpolymer (e.g., VNB-EPDM), having an Mw (g/mol) of about 30,000, about 50,000, about 70,000, about 80,000, about 90,000, about 100,000, about 120,000, or about 150,000 to about 180,000, about 200,000, about 250,000, about 300,000, about 500,000, or about 1,000,000. For example, the polymer has an Mw in a range from about 50,000 to about 500,000, about 100,000 to about 300,000, about 125,000 to about 250,000, or about 150,000 to about 200,000. All molecular weights are reported in g/mol unless otherwise noted.

A catalyst of the present disclosure can be capable of producing a terpolymer, such as VNB-EPDM, having an Mn (g/mol) of about 20,000, about 25,000, about 30,000, about 35,000, about 40,000, or about 50,000 to about 60,000, about 70,000, about 80,000, about 90,000, about 100,000, about 120,000, or about 150,000. For example, the polymer has an Mn in a range from about 20,000 to about 150,000, about 30,000 to about 120,000, about 40,000 to about 100,000, or about 50,000 to about 75,000.

A catalyst of the present disclosure is capable of producing an olefin polymer, such as a terpolymer (e.g., VNB-EPDM), having an Mz (g/mol) of about 100,000, about 300,000, about 500,000, or about 1,000,000 to about 1,500,000, about 2,000,000, about 2,500,000, about 3,000,000, about 3,500,000, about 4,000,000, about 5,000,000, about 6,000,000, or about 7,000,000. For example, the polymer has an Mz in a range from about 100,000 to about 6,000,000, about 500,000 to about 5,000,000, about 1,000,000 to about 4,500,000, or about 2,000,000 to about 3,000,000.

In one or more embodiments, a catalyst of the present disclosure is capable of producing an olefin polymer, such as a terpolymer (e.g., VNB-EPDM), having an Mw/Mn value from about 1 to about 5, for example, about 1.5 to about 4, about 1.75 to about 3.5, about 2 to about 3, or about 2.4 to about 2.8.

In one or more embodiments, the olefin polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

In one or more embodiments, the olefin polymer produced herein has a composition distribution breadth index (CDBI) of 50% or more, such as 60% or more, such as 70% or more. CDBI is a measure of the composition distribution of monomer within the polymer chains and is measured by the procedure described in PCT publication WO 1993/003093, published Feb. 18, 1993, specifically columns 7 and 8 as well as in Wild et al. (1982) *J. Poly. Sci., Poly. Phys. Ed.*, v.20, p. 441 and U.S. Pat. No. 5,008,204, including that fractions having a weight average molecular weight (Mw) below 15,000 are ignored when determining CDBI.

Blends

In one or more embodiments, the polymer (such as polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, LDPE, LLDPE, HDPE, random copolymer of ethylene and propylene, and/or butene, hexene, polybutene, ethylene vinyl acetate, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In one or more embodiments, the polymer (such as polyethylene and/or polypropylene) is present in the above blends in a range from about 10 wt % to about 99 wt %, based upon the weight of the polymers in the blend, such as about 20 wt % to about 95 wt %, such as at least 30 wt % to about 90 wt %, such as at least 40 wt % to about 90 wt %, such as at least 50 wt % to about 90 wt %, such as at least 60 wt % to about 90 wt %, such as at least 70 wt % to about 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

Specifically, any of the foregoing polymers, such as the foregoing polyethylenes or blends thereof, may be used in a variety of end-use applications. Such applications include, for example, mono- or multi-layer blown, extruded, and/or shrink films. These films may be formed by any number of extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, such as between 5 and 7, and in the Transverse Direction (TD) at a ratio of up to 15, such as 7 to 9. However, in at least one embodiment the film is oriented to the same extent in both the MD and TD directions.

The films may vary in thickness depending on the intended application; however, films of a thickness from about 1 μm to about 50 μm are usually suitable. Films intended for packaging are usually from about 10 μm to about 50 μm thick. The thickness of the sealing layer is typically about 0.2 μm to about 50 μm. There may be a sealing layer on both the inner and outer surfaces of the film or the sealing layer may be present on only the inner or the outer surface.

In one or more embodiments, one or more layers may be modified by corona treatment, electron beam irradiation, gamma irradiation, flame treatment, or microwave. In one or more embodiments, one or both of the surface layers is modified by corona treatment.

This invention further relates to:
1. A polymerization process to produce an olefin polymer, comprising:
   A) contacting a transition metal complex with a mixture of olefin monomers comprising ethylene, propylene, and a cyclic diene to produce the olefin polymer, wherein the mixture of olefin monomers comprises: a weight ratio of the ethylene to the cyclic diene of about 20:1 to about 500:1;
      a weight ratio of the propylene to the cyclic diene of about 100:1 to about 1,000:1; and
      a weight ratio of the propylene to the ethylene of about 1:1 to about 40:1; and
   B) recovering the olefin polymer, wherein the olefin polymer has: an ethylene content of about 40 wt % to about 85 wt %;
      a propylene content of about 15 wt % to about 50 wt %;
      a cyclic diene content of about 0.05 wt % to about 5 wt %; and
      a $g'_{(vis)}$ value of about 0.90 to 1; and
wherein the transition metal complex is represented by Formula (I):

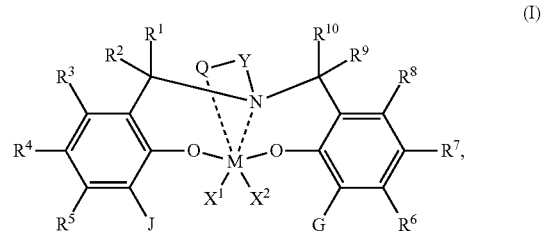

wherein:
M is a Group 4 transition metal;
each $X^1$ and $X^2$ is independently a univalent $C_1$ to $C_{20}$ hydrocarbyl, a $C_1$ to $C_{20}$ substituted hydrocarbyl, a heteroatom, or a heteroatom containing group; or $X^1$ and $X^2$ join together to form a $C_4$ to $C_{62}$ cyclic or polycyclic ring structure;

Q is a neutral donor group comprising a Group 15 atom or a Group 16 atom;

Y is a substituted or unsubstituted divalent $C_1$-$C_{40}$ hydrocarbyl, or a substituted or unsubstituted heterocycle with Q;

each $R^1$, $R^2$, $R^3$, $R^4$, $R^5$, $R^6$, $R^7$, $R^8$, $R^9$, and $R^{10}$ is independently a hydrogen, a $C_1$-$C_{40}$ hydrocarbyl, a $C_1$-$C_{40}$ substituted hydrocarbyl, a heteroatom, or a heteroatom containing group; or two or more of adjacent $R^1$ to $R^{10}$ join together to form a $C_4$ to $C_{62}$ cyclic, polycyclic, heterocyclic ring, or a combination thereof;

J is a $C_7$ to $C_{60}$ fused polycyclic group; and

G is a hydrogen, $C_7$ to $C_{60}$ fused polycyclic group, a $C_1$-$C_{60}$ hydrocarbyl, a $C_1$-$C_{60}$ substituted hydrocarbyl, a heteroatom, or a heteroatom containing group; or forms a $C_4$ to $C_{60}$ cyclic or polycyclic ring with $R^6$, $R^7$, or $R^8$, or a combination thereof 2. The polymerization process of paragraph 1, wherein the cyclic diene comprises an endocyclic alkene and a vinyl group.

3. The polymerization process of paragraphs 1 or 2, wherein the olefin polymer has a g'$_{(vis)}$ value of about 0.95 to 1.

4. The polymerization process according to any one of paragraphs 1-3, wherein the olefin polymer has a g'$_{(vis)}$ value of about 0.97 to 1.

5. The polymerization process according to any one of paragraphs 1-4, wherein the olefin polymer has a g'$_{(vis)}$ value of about 0.98 to 1.

6. The polymerization process according to any one of paragraphs 1-5, wherein the olefin polymer has a Mooney viscosity ML (1+4) at 125° C. of about 20 MU to about 100 MU.

7. The polymerization process according to any one of paragraphs 1-6, wherein the olefin polymer has a Mooney viscosity ML (1+4) at 125° C. of about 30 MU to about 60 MU.

8. The polymerization process according to any one of paragraphs 1-7, wherein the olefin polymer has an MLRA of about 50 MU to about 200 MU.

9. The polymerization process according to any one of paragraphs 1-8, wherein the olefin polymer has an MLRA of about 100 MU to about 150 MU.

10. The polymerization process according to any one of paragraphs 1-9, wherein the cyclic diene comprises vinyl norbornene (VNB), ethylidene norbomene (ENB), dicyclopentadiene (DCPD), or any combination thereof.

11. The polymerization process according to any one of paragraphs 1-10, wherein the mixture of olefin monomers comprises:
a weight ratio of the ethylene to the cyclic diene of about 40:1 to about 200:1;
a weight ratio of the propylene to the cyclic diene of about 200:1 to about 500:1; and
a weight ratio of the propylene to the ethylene of about 2:1 to about 10:1.

12. The polymerization process according to any one of paragraphs 1-11, wherein the mixture of olefin monomers comprises:
a weight ratio of the ethylene to the cyclic diene of about 50:1 to about 100:1;
a weight ratio of the propylene to the cyclic diene of about 300:1 to about 400:1; and
a weight ratio of the propylene to the ethylene of about 3:1 to about 7:1.

13. The polymerization process according to any one of paragraphs 1-12, wherein the olefin polymer has:
an ethylene content of about 50 wt % to about 75 wt %;
a propylene content of about 25 wt % to about 40 wt %; and
a cyclic diene content of about 0.1 wt % to about 3 wt %.

14. The polymerization process according to any one of paragraphs 1-13, wherein the olefin polymer has:
an ethylene content of about 55 wt % to about 70 wt %;
a propylene content of about 28 wt % to about 38 wt %; and
a cyclic diene content of about 0.2 wt % to about 2 wt %.

15. The polymerization process according to any one of paragraphs 1-14, wherein the olefin polymer has:
an ethylene content of about 60 wt % to about 67 wt %;
a propylene content of about 30 wt % to about 35 wt %; and
a cyclic diene content of about 0.25 wt % to about 1 wt %.

16. The polymerization process according to any one of paragraphs 1-15, wherein M is Hf or Zr.

17. The polymerization process according to any one of paragraphs 1-16, wherein Q comprises O, S, N, or P.

18. The polymerization process according to any one of paragraphs 1-17, wherein Q comprises N or O.

19. The polymerization process according to any one of paragraphs 1-18, wherein Y is a divalent $C_1$-$C_{20}$ hydrocarbyl.

20. The polymerization process according to any one of paragraphs 1-19, wherein Y is a divalent $C_1$-$C_5$ hydrocarbyl.

21. The polymerization process according to any one of paragraphs 1-20, wherein G and J is independently carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, naphthyl, substituted naphthyl, anthracenyl, substituted anthracenyl, phenanthryl, or substituted phenanthryl.

22. The polymerization process according to any one of paragraphs 1-21, wherein the transition metal complex is represented by Formula (VI) or (VII):

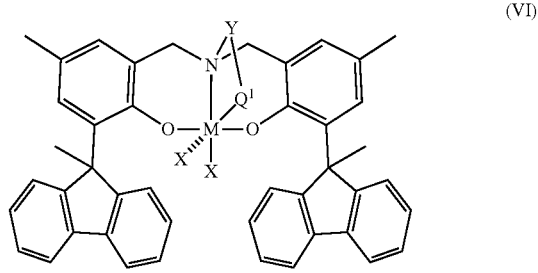

(VI)

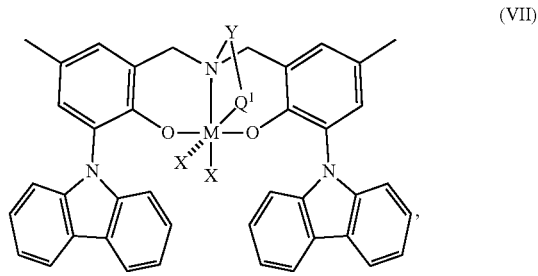

(VII)

wherein:
Y is a $C_1$-$C_3$ divalent hydrocarbyl;
Q[1] is NR'$_2$, OR', SR', PR'$_2$, where R' is as defined for R';
or the -(-Q-Y—)— fragment forms a substituted or unsubstituted heterocycle ring; and each X is independently benzyl, methyl, ethyl, chloride, bromide, or alkoxide.

23. The polymerization process of paragraph 22, wherein R' is methyl, ethyl, propyl, isopropyl, phenyl, cyclohexyl, or linked together to form a five or six-membered ring.
24. The polymerization process according to any one of paragraphs 1-23, wherein the transition metal complex is represented by Formula (VIII):

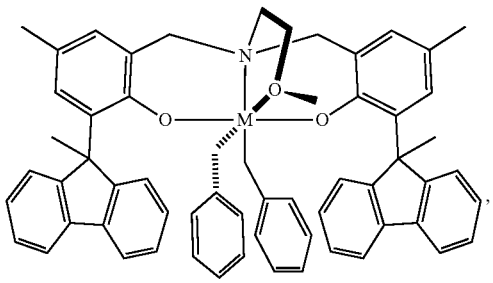

(VIII)

wherein M is Zr or Hf
25. The polymerization process according to any one of paragraphs 1-24, wherein a catalyst system is contacted with the olefin monomers, wherein the catalyst system comprises the transition metal complex and an activator.
26. The polymerization process of paragraph 25, wherein the catalyst system further comprises a chain transfer agent.
27. The polymerization process of paragraph 26, wherein the chain transfer agent comprises a $C_1$-$C_{20}$ alkyl aluminum compound, a $C_1$-$C_{20}$ alkyl zinc compound, or a combination thereof
28. The polymerization process of paragraph 26, wherein the chain transfer agent comprises a $C_1$-05 alkyl aluminum compound, a $C_1$-$C_5$ alkyl zinc compound, or a combination thereof.
29. The polymerization process according to any one of paragraphs 25-28, wherein the chain transfer agent is present in the catalyst system at a molar ratio of the transition metal to the chain transfer agent of 10:1 or greater.
30. The polymerization process according to any one of paragraphs 25-29, wherein the activator is an alumoxane.
31. The polymerization process according to any one of paragraphs 25-30, wherein the activator is a non-coordinating anion.
32. The polymerization process according to any one of paragraphs 25-31, wherein the activator is selected from the group consisting of methyl alumoxane, ethyl alumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl) borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, tetrakis(pentafluorophenyl)borate, 4-(tris(pentafluoropheny0borate)-2,3,5,6-tetrafluoropyridine, and any combination thereof
33. The polymerization process according to any one of paragraphs 25-32, further comprising a scavenger.
34. The polymerization process according to any one of paragraphs 25-33, wherein less than 5 wt % of the olefin polymer is insoluble after extraction in boiling xylene for 5 hours.
35. The polymerization process according to any one of paragraphs 25-34, wherein 99 wt % of the monomers introduced into the polymerization process are converted to polymer.
36. A composition comprising the olefin polymer according to any one of paragraphs 1-35.

Experimental

$^1$H NMR for Ligand and Catalyst Characterization: Chemical structures are determined by $^1$H NMR. $^1$H NMR data are collected at room temperature (e.g., 23° C.) in a 5 mm probe using either a 400 or 500 MHz Bruker spectrometer with deuterated methylene chloride or deuterated benzene.

EXAMPLES

Synthesis of Ligand and Catalyst Compounds
9-methyl-9H-fluoren-9-ol (S1). In a glovebox, a 250 mL round-bottom flask was charged with 9H-fluoren-9-one (10.300 g, 57.2 mmol, 1.0 eq) and THF (80 mL), and the resulting solution was cooled to 0° C. MeMgBr (20.0 mL of a 3.0 M solution, 0.6 mmol, 1.05 eq) was then slowly added using a syringe to the stirring solution, which turned into a slurry at the end of the addition. The mixture was warmed to room temperature and allowed to stir for 16 hours. The reaction vessel was then removed from the glovebox, and the reaction mixture was poured into a saturated solution of NH$_4$Cl (200 mL) and washed with brine (100 mL×2). The organic portion was collected, dried over MgSO$_4$, filtered and concentrated under a nitrogen stream. The crude product was recrystallized in pentane (200 mL) yielding S1 (10.077 g, 90%) as a white powder. Alternatively, the product S1 can be purified on a Biotage™ silica column with a gradient of 5%-20% ethyl acetate in hexane.

4-methyl-2-(9-methyl-9H-fluoren-9-yl)phenol (S2). In a 500 mL round-bottom flask, p-cresol (7.8 g, 72 mmol, 2 eq) was dissolved in DCM (200 mL) followed by slow addition of concentrated sulfuric acid (3.916 g, 37.93 mmol, 1 eq). A solution of S1 (7.403 g, 37.72 mmol, 1 eq) in DCM (150 mL) was then added to the flask using an addition funnel, and the resulting yellow solution was stirred for 3 hours at room temperature during which the color turned green. The reaction was basified with 2M NaOH to pH of about 9-10. The organic layer was collected, washed with brine, dried with MgSO$_4$ and concentrated under a nitrogen stream. The crude product was purified over a Biotage™ silica column using a gradient of 5%-20% DCM in hexane, which yielded S2 (8.437 g, 78%) as a white crystalline powder.

2-(((2-hydroxy-3-(9-methyl-9H-fluoren-9-yl)benzyl)(2-methoxyethyl)amino) methyl)-4-methyl-6-(9-methyl-9H-fluoren-9-yl)phenol (L4). A 50 mL round bottom flask was charged with S2 (0.696 g, 2.43 mmol, 2 eq), paraformaldehyde (0.116 g, 3.86 mmol, 3 eq), 2-methoxyethanamine (0.091 g, 1.21 mmol, 1 eq), 0.6 mL water and 3 mL methanol. The resulting white suspension was stirred at 80° C. overnight then cooled to room temperature. The supernatant was decanted, and the crude product was purified over a Biotage silica column using a gradient of 0-30% ethyl acetate in hexane, which yielded the product (L4) (0.262 g, 32%) as a white powder.

2-methoxy-N,N-bis[methylene(4-methyl-2-(9-methyl-9H-fluoren-9-yl)phenolate)] ethanamine zirconium(IV) dibenzyl (Zr-VIII). In a glovebox, a 20 mL vial was charged with the product (L4) (0.262 g, 0.373 mmol, 1 eq), ZrBn$_4$ (0.1704 g, 0.3739 mmol, 1 eq), and 3 mL toluene. The resulting orange solution was stirred at 60° C. for 3 hours then cooled to room temperature. The volatiles were removed from the mixture under nitrogen flow, and the resulting residue was recrystallized in 2 mL pentane at −35° C. Removal of the supernatant followed by drying under reduced pressure yielded Zr-VIII (0.3566 g, quantitative) as a pale yellow powder. $^1$H NMR (400 MHz, CD$_2$Cl$_2$)—broad and overlapping resonances; δ=7.87, 7.79, 7.77, 7.51, 7.43, 7.34, 7.28, 7.18, 6.84, 6.66, 6.61, 3.19, 3.07, 2.83, 2.80, 2.46, 2.00.

Polymerization Examples

All examples were produced using a solution polymerization process in a 1.0-liter continuous stirred-tank reactor (autoclave reactor). The autoclave reactor was equipped with a stirrer, a water-cooling/steam-heating element with a temperature controller, and a pressure controller. Solvents and monomers were purified by passing through purification columns packed with mol sieves. Isohexane (solvent) was passed through four columns in series whereas ethylene, propylene, and toluene were each purified by passing through two columns in series. Purification columns are regenerated periodically (about twice/year) or whenever there is evidence of low catalyst activity. 5-ethylidene-2-norbornene (ENB) was purified in a glove box by passing through a bed of basic alumina under a steady nitrogen gas purge. 5-vinyl-2-norbornene (VNB) was purified by stirring the diene with sodium-potassium alloy (NaK) then filtering through a bed of basic or neutral alumina. Tri-n-octylaluminum (TNOAL, available from Sigma Aldrich, Milwaukee, Wis.) solution was diluted to a concentration of 1.84× 10$^{-6}$ using isohexane.

Isohexane and TNOAL solutions were fed using Pulsa pumps and their flow rates were controlled using pump calibration curves. Purified propylene, and VNB/ENB solutions were also fed using Pulsa pumps but their flow rates were controlled using mass-flow controllers. The feed rate of purified ethylene was also regulated using a mass flow controller. Ethylene and propylene combined into a single line before entering a manifold upstream of the reactor. Isohexane, TNOAL solution, and diene solution lines also combined in a single line before entering the same manifold. The resulting two lines merged further downstream and the combined mixture of monomers and solvent was fed into the reactor using a single tube.

Catalyst used was Zr-VIII. The activator used was N,N-dimethylanilinium tetrakis(pentafluorophenyl) borate (Activator-1). Catalyst solution was prepared daily and used on the same day. The solution was prepared by dissolving the catalyst and the activator in 450 mL toluene (catalyst concentration=0.94 to 1.34×10$^{-07}$ mol/mL, catalyst/activator (molar ratio) about 0.98). This solution was pumped into the reactor through a designated dip-tube at a desired rate using an Isco pump.

Composition was controlled by adjusting the feed ratio of the monomers. No hydrogen was added. All the reactions were carried out at a gauge pressure of about 2.2 MPa and a temperature of 100° C. The collected samples were first placed on a boiling-water steam table in a hood to evaporate a large fraction of the solvent and unreacted monomers, and then, dried in a vacuum oven at a temperature of about 90° C. for about 12 hours. The vacuum oven dried samples were weighed to obtain yields. Ethylene, ENB, and VNB content of the polymers were determined by FT-IR. Monomer conversions were calculated using the polymer yield, composition and the amount of monomers fed into the reactor. Catalyst activity and productivity were calculated based upon the yield and the feed rate of catalyst. Mooney measurements were made to gauge molecular weight and long-chain branching of the EPDM terpolymers. Samples were later analyzed using GPC as described below to determine the molecular weight distribution as well as g' values.

Table 1 provides the reaction conditions for ethylene VNB-EPDM using Activator-1. The polymerization was run for at least one hour to achieve steady-state conditions then polymer was collected for 40 minutes.

TABLE 1

| | |
|---|---|
| Catalyst | Zr-VIII |
| Activator | Activator-1 |
| Rxr T, ° C. | 100 |
| Rxr P, psig | 320 |
| Ethylene feed, g/min | 2 |
| Propylene feed, g/min | 10 |
| VNB feed, g/min | 0.03 |
| Catalyst feed, mol/min | 7.067 × 10$^{-8}$ |
| Activator feed, mol/min | 7.211 × 10$^{-8}$ |
| Scavenger feed, mol/min | 7.372 × 10$^{-6}$ |
| Isohexane feed, g/min | 61.3 |
| Hydrogen, sccm | 0 |

The resultant polymer was analyzed by FT-IR (see below) to determine percent ethylene and VNB incorporation, by GPC-4D (see below) to determine the molecular weight and g'$_{(vis)}$, and by Mooney Data (see below) to determine ML, MLRA, and cMLRA, as outlined in Table 2 and shown by the GPC-4D plot in FIG. 2. Inspection of the reactor after shutdown showed no fouling and analysis of the polymer product by GPC-4D showed a mass recovery (e.g., conversion of monomers to polymeric product) of 99 wt %, consistent with the absence of gels. The GPC-4D plot shows two graphs and summarized data collected on the terpolymer VNB-EPDM. The results of the GPC-4D plot also indicates a weight percent of incorporated ethylene of about 66.1 wt % and a branching index (g'$_{(vis)}$) of about 0.973.

TABLE 2

| | |
|---|---|
| Polymer, g/min | 1.2 |
| Sample quantity, g | 49.2 |
| Collection time, min | 40 |
| Catalyst efficiency, g polymer/g catalyst | 18450 |
| FT-IR | |
| C2=, wt % uncorrected | 62.7 |
| VNB, wt % | 0.4 |
| Mooney Data | |
| ML | 43.4 |
| MLRA | 126.2 |
| cMLRA (at 80 ML) | 304 |
| GPC-4D Data | |
| C2=, wt % | 66.10 |
| M$_n$ (LS), g/mol | 65,475 |
| M$_w$ (LS), g/mol | 172,392 |
| M$_z$ (LS), g/mol | 3,567,254 |
| M$_w$/M$_n$ | 2.63 |
| g' (vis) | 0.973 |

Figure 2:
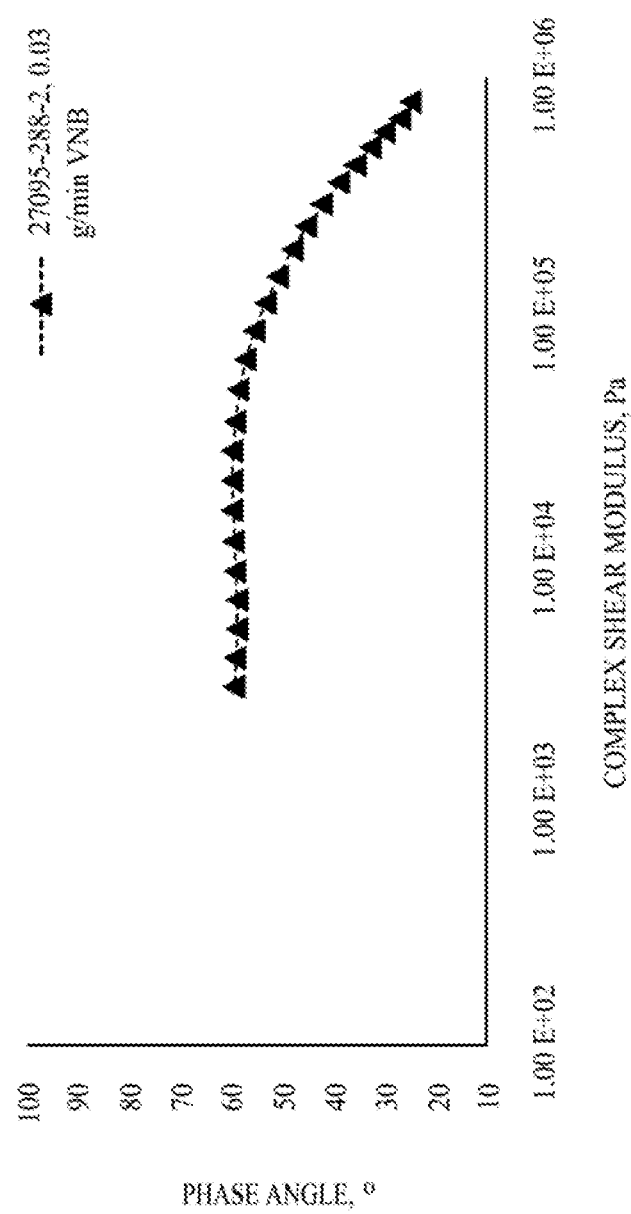
FIG. 2 is a van Gurp-Palmen plot showing the Phase Angle versus the Complex Shear Modulus of a terpolymer produced by processes described and discussed herein, according to one embodiment.

FIG. 2 is a van Gurp-Palmen plot showing rheological data presented by plotting the Phase Angle versus the Complex Shear Modulus for olefin terpolymers discussed and described in the present disclosure. The van Gurp-Palmen plot exhibits the degree of shear-thinning behavior of the resultant polymer.

Polymer Characterization

IR Spectrometry. Total ethylene content of the elastomers was determined using a Nicolet 6700 FTIR. The granular elastomers from the reactor was first extruded and pelletized. Pellet samples were compression molded into a 10 mil thick pad. The pressed pad was placed in the instrument such that the IR beam passes through the pad and then measures the remaining signal on the other side. Methyl groups from the propylene affect the absorption, so the machine was calibrated to a range of ethylene content.

Molecular Weight Determinations. The distribution and the moments of molecular weight (Mw, Mn, Mz, and Mw/Mn) in Table 1 were determined by using a high temperature Gel Permeation Chromatography (Polymer Char GPC-IR) equipped with a multiple-channel band-filter based Infrared detector IR5, an 18-angle light scattering detector and a viscometer (not used here). The GPC trace and mass balance traces are for Sample 3 are shown in FIG. 1. Three Agilent PLgel 10 µm Mixed-B LS columns were used to provide olefin polymer separation through size exclusion. Aldrich reagent grade 1,2,4-trichlorobenzene (TCB) with 300 ppm of the antioxidant butylated hydroxytoluene was used as the mobile phase. The TCB mixture was filtered through a 0.1 µm polytetrafluoroethylene filter and degassed with an online degasser before entering the GPC instrument. The nominal flow rate was 1.0 mL/min and the nominal injection volume was 200 µL. The whole system including transfer lines, columns, detectors were contained in an oven maintained at 145° C. A given amount of olefin polymer sample was weighed and sealed in a standard vial with 80 µL flow marker (heptane) added to it. After loading the vial in the auto-sampler, olefin polymer was automatically dissolved in the instrument with 8 mL added TCB solvent. The olefin polymer was dissolved at 160° C. with continuous shaking for about 1 hour for most polyethylene samples or 2 hours for polypropylene samples. The TCB densities used in concentration calculation were 1.463 g/mL at 23° C. and 1.284 g/mL at 145° C. The sample solution concentration was from 0.2 to 2.0 mg/mL, with lower concentrations being used for higher molecular weight samples.

The concentration "c" at each point in the chromatogram was calculated from the baseline-subtracted IR5 broadband signal intensity "I" using the following equation:

$$c = \beta I,$$

where β is the mass constant determined with polyethylene or polypropylene standards. The mass recovery was calculated from the ratio of the integrated area of the concentration chromatography over elution volume and the injection mass which is equal to the pre-determined concentration multiplied by injection loop volume.

The conventional molecular weight (IR molecular weight "M") was determined by combining universal calibration relationship with the column calibration which was performed with a series of mono-dispersed polystyrene (PS) standards ranging from 700 g/mole to 10,000,000 g/mole. The molecular weight "M" at each elution volume was calculated with following equation:

$$\log M = \frac{\log(K_{PS}/K)}{a+1} + \frac{a_{PS}+1}{a+1} \log M_{PS},$$

where the variables with subscript "PS" stands for "polystyrene" while those without a subscript are for the test samples. In this method, $a_{PS}=0.67$ and $K_{PS}=0.000175$ while "a" and "K" are calculated from a series of empirical formula established in the literature (Sun, T. et al. (2001) *Macromolecules*, v.34(19) pp. 6812-6820). Specifically, the value of a/K is 0.695/0.000579 for polyethylene and 0.705/0.0002288 for polypropylene. Molecular weight is expressed in g/mole or kg/mole. The values for Mw are determined ±500 g/mole, and for Mn±100 g/mole.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR such as an ExxonMobil Chemical Company commercial grade of LLDPE, polypropylene, etc.

The LS detector is the 18-angle Wyatt Technology High Temperature Dawn Heleosii™. The LS molecular weight "M" at each point in the chromatogram is determined by analyzing the LS output using the Zimm model for static light scattering (W. Burchard & W. Ritchering, "Dynamic Light Scattering from Polymer Solutions," in 80 *Progress in Colloid & Polymer Science*, pp. 151-163 (Steinkopff, 1989)):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the infrared analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm.

A high temperature Agilent (or Viscotek Corporation) viscometer, which has four capillaries arranged in a Wheatstone bridge configuration with two pressure transducers, is used to determine specific viscosity and branching. One transducer measures the total pressure drop across the detector, and the other, positioned between the two sides of the bridge, measures a differential pressure. The specific viscosity, ηs, for the solution flowing through the viscometer is calculated from their outputs. The intrinsic viscosity, [η], at each point in the chromatogram is calculated from the following equation:

$$[\eta] = \eta s/c,$$

where c is concentration and was determined from the infrared (IR5) broadband channel output. The viscosity "M" at each point is calculated from the below equation:

$$M = K_{PS} M^{\alpha_{PS}+1}/[\eta],$$

The branching index ($g'_{avg}$) is calculated using the output of the GPC-IR5-LS-VIS method as follows. The average intrinsic viscosity, $[\eta_{avg}]$, of the sample is calculated by:

$$[\eta]_{avg} = \frac{\sum c_i [\eta]_i}{\sum c_i},$$

where the summations are over the chromatographic slices, "i", between the integration limits. The branching index $g'_{avg}$ is defined as:

$$g'_{avg} = \frac{[\eta]_{avg}}{kM_v^\alpha}.$$

The $M_v$ is the viscosity-average molecular weight based on molecular weights determined by LS analysis. Also, as used herein the $g'_{1000}$ is the value of g' at a molecular weight of 1,000,000 g/mole, thus a measure of the amount of branching on the high molecular weight component of the polymer. Branching data for inventive Sample 3 is shown in FIG. 1.

Phase Angle. Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting compression-molded sample of resin onto the parallel plates. To determine the samples viscoelastic behavior, frequency sweeps in the range from 0.01 to 385 rad/s were carried out at a temperature of 190° C. under constant strain. Depending on the molecular weight and temperature, strains of 10% and 15% were used and linearity of the response was verified. A nitrogen stream was circulated through the sample oven to minimize chain extension or cross-linking during the experiments. All the samples were compression molded at 190° C. and no stabilizers were added. A sinusoidal shear strain is applied to the material. If the strain amplitude is sufficiently small the material behaves linearly. It can be shown that the resulting steady-state stress will also oscillate sinusoidally at the same frequency but will be shifted by a phase angle $\Delta$ with respect to the strain wave. The stress leads the strain by $\Delta$. For purely elastic materials $\Delta=0°$ (stress is in phase with strain) and for purely viscous materials, $\Delta=90°$ (stress leads the strain by 90° although the stress is in phase with the strain rate). For viscoelastic materials, $0<\Delta<90$. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4. Dynamic viscosity is also referred to as complex viscosity or dynamic shear viscosity.

Overall, novel transition metal catalysts and the respective bridged phenolate ligands contained on the catalyst, as well as, catalyst systems and polymerization processes are provided. The bridged phenolate ligand is bonded to the metal atom via covalent bonds by two oxygens, a coordinate covalent bond by a Group 15 atom, and a coordinate covalent bond by a Group 15 or 16 atom. The transition metal complex or catalyst provides relatively high endocyclic alkene/vinyl selectivity to minimize hyperbranching during the production of olefin polymeric materials, such as EPDM and other terpolymers that are free or substantially free of gels.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

What is claimed is:

1. A polymerization process to produce an olefin polymer, comprising:
   A) contacting a transition metal complex with a mixture of olefin monomers comprising ethylene, propylene, and a cyclic diene to produce the olefin polymer, wherein the mixture of olefin monomers comprises:
      a weight ratio of the ethylene to the cyclic diene of about 20:1 to about 500:1;
      a weight ratio of the propylene to the cyclic diene of about 100:1 to about 1,000:1; and
      a weight ratio of the propylene to the ethylene of about 1:1 to about 40:1; and
   B) recovering the olefin polymer, wherein the olefin polymer has:
      an ethylene content of about 40 wt % to about 85 wt %;
      a propylene content of about 15 wt % to about 50 wt %;
      a cyclic diene content of about 0.05 wt % to about 5 wt %; and
      a $g'_{(vis)}$ value of about 0.90 to 1; and
   wherein the transition metal complex is represented by Formula (I):

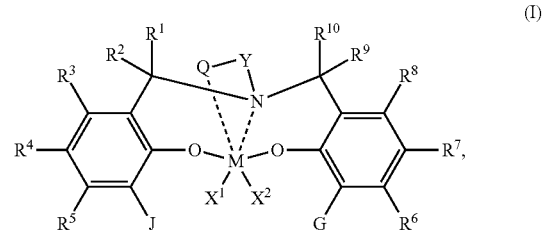

wherein:
- M is a Group 4 transition metal;
- each $X^1$ and $X^2$ is independently a univalent $C_1$ to $C_{20}$ hydrocarbyl, a $C_1$ to $C_{20}$ substituted hydrocarbyl, a heteroatom, or a heteroatom containing group; or $X^1$ and $X^2$ join together to form a $C_4$ to $C_{62}$ cyclic or polycyclic ring structure;
- Q is a neutral donor group comprising a Group 15 atom or a Group 16 atom;
- Y is a substituted or unsubstituted divalent $C_1$-$C_{40}$ hydrocarbyl, or a substituted or unsubstituted heterocycle with Q;
- each $R^1$, $R^2$, $R^3$, $R^4$, $R^5$, $R^6$, $R^7$, $R^8$, $R^9$, and $R^{10}$ is independently a hydrogen, a $C_1$-$C_{40}$ hydrocarbyl, a $C_1$-$C_{40}$ substituted hydrocarbyl, a heteroatom, or a heteroatom containing group; or two or more of adjacent $R^1$ to $R^{10}$ join together to form a $C_4$ to $C_{62}$ cyclic, polycyclic, heterocyclic ring, or a combination thereof;
- J is a $C_7$ to $C_{60}$ fused polycyclic group; and
- G is a hydrogen, $C_7$ to $C_{60}$ fused polycyclic group, a $C_1$-$C_{60}$ hydrocarbyl, a $C_1$-$C_{60}$ substituted hydrocarbyl, a heteroatom, or a heteroatom containing group; or forms a $C_4$ to $C_{60}$ cyclic or polycyclic ring with $R^6$, $R^7$, or $R^8$, or a combination thereof.

2. The polymerization process of claim 1, wherein the cyclic diene comprises an endocyclic alkene and a vinyl group.

3. The polymerization process of claim 1, wherein the olefin polymer has a g'$_{(vis)}$ value of about 0.95 to 1.

4. The polymerization process of claim 1, wherein the olefin polymer has a g'$_{(vis)}$ value of about 0.97 to 1.

5. The polymerization process of claim 1, wherein the olefin polymer has a g'$_{(vis)}$ value of about 0.98 to 1.

6. The polymerization process of claim 1, wherein the olefin polymer has a Mooney viscosity ML (1+4) at 125° C. of about 20 MU to about 100 MU.

7. The polymerization process of claim 1, wherein the olefin polymer has a Mooney viscosity ML (1+4) at 125° C. of about 30 MU to about 60 MU.

8. The polymerization process of claim 1, wherein the olefin polymer has an MLRA of about 50 MU to about 200 MU.

9. The polymerization process of claim 1, wherein the olefin polymer has an MLRA of about 100 MU to about 150 MU.

10. The polymerization process of claim 1, wherein the cyclic diene comprises vinyl norbornene (VNB), ethylidene norbornene (ENB), dicyclopentadiene (DCPD), or any combination thereof.

11. The polymerization process of claim 1, wherein the mixture of olefin monomers comprises:
- a weight ratio of the ethylene to the cyclic diene of about 40:1 to about 200:1;
- a weight ratio of the propylene to the cyclic diene of about 200:1 to about 500:1; and
- a weight ratio of the propylene to the ethylene of about 2:1 to about 10:1.

12. The polymerization process of claim 1, wherein the mixture of olefin monomers comprises:
- a weight ratio of the ethylene to the cyclic diene of about 50:1 to about 100:1;
- a weight ratio of the propylene to the cyclic diene of about 300:1 to about 400:1; and
- a weight ratio of the propylene to the ethylene of about 3:1 to about 7:1.

13. The polymerization process of claim 1, wherein the olefin polymer has:
- an ethylene content of about 50 wt % to about 75 wt %;
- a propylene content of about 25 wt % to about 40 wt %; and
- a cyclic diene content of about 0.1 wt % to about 3 wt %.

14. The polymerization process of claim 1, wherein the olefin polymer has:
- an ethylene content of about 55 wt % to about 70 wt %;
- a propylene content of about 28 wt % to about 38 wt %; and
- a cyclic diene content of about 0.2 wt % to about 2 wt %.

15. The polymerization process of claim 1, wherein the olefin polymer has:
- an ethylene content of about 60 wt % to about 67 wt %;
- a propylene content of about 30 wt % to about 35 wt %; and
- a cyclic diene content of about 0.25 wt % to about 1 wt %.

16. The polymerization process of claim 1, wherein M is Hf or Zr.

17. The polymerization process of claim 1, wherein Q comprises O, S, N, or P.

18. The polymerization process of claim 1, wherein Q comprises N or O.

19. The polymerization process of claim 1, wherein Y is a divalent $C_1$-$C_{20}$ hydrocarbyl.

20. The polymerization process of claim 1, wherein Y is a divalent $C_1$-$C_5$ hydrocarbyl.

21. The polymerization process of claim 1, wherein G and J is independently carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, substituted fluorenyl, naphthyl, substituted naphthyl, anthracenyl, substituted anthracenyl, phenanthryl, or substituted phenanthryl.

22. The polymerization process of claim 1, wherein the transition metal complex is represented by Formula (VI) or (VII):

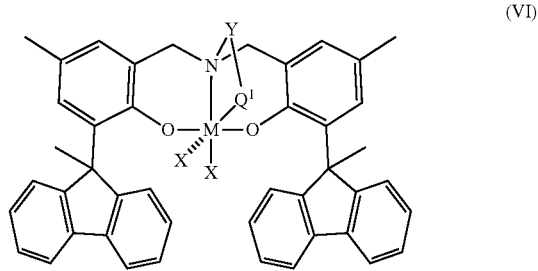

(VI)

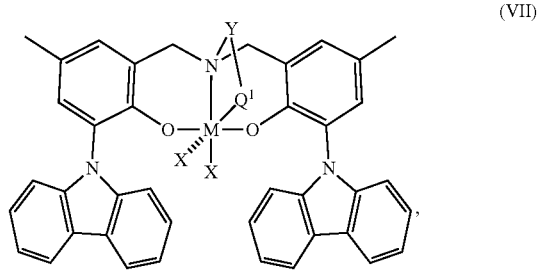

(VII)

wherein:
- Y is a $C_1$-$C_3$ divalent hydrocarbyl;
- $Q^1$ is $NR'_2$, $OR'$, $SR'$, $PR'_2$, where R' is as defined for $R^1$; or the -(-Q-Y—)— fragment forms a substituted or unsubstituted heterocycle ring; and each X is independently benzyl, methyl, ethyl, chloride, bromide, or alkoxide.

23. The polymerization process of claim 22, wherein R' is methyl, ethyl, propyl, isopropyl, phenyl, cyclohexyl, or linked together to form a five or six-membered ring.

24. The polymerization process of claim 1, wherein the transition metal complex is represented by Formula (VIII):

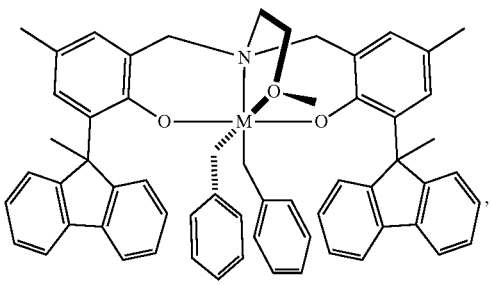

(VIII)

wherein M is Zr or Hf.

25. The polymerization process of claim 1, wherein the contacting includes contacting an activator, along with the transition metal complex, wherein the activator and the transition metal complex forms a catalyst system, with the mixture of olefin monomers.

26. The polymerization process of claim 25, wherein the catalyst system further comprises a chain transfer agent.

27. The polymerization process of claim 26, wherein the chain transfer agent comprises a $C_1$-$C_{20}$ alkyl aluminum compound, a $C_1$-$C_{20}$ alkyl zinc compound, or a combination thereof.

28. The polymerization process of claim 27, wherein the chain transfer agent comprises a $C_1$-$C_5$ alkyl aluminum compound, a $C_1$-$C_5$ alkyl zinc compound, or a combination thereof.

29. The polymerization process of claim 26, wherein the chain transfer agent is present in the catalyst system at a molar ratio of the transition metal to the chain transfer agent of 10:1 or greater.

30. The polymerization process of claim 25, wherein the activator is an alumoxane.

31. The polymerization process of claim 25, wherein the activator is a non-coordinating anion.

32. The polymerization process of claim 25, wherein the activator is selected from the group consisting of methyl alumoxane, ethyl alumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra(perfluorophenyl)borate, triphenylcarbenium tetrakis(perfluorophenyl)borate, 1-(4-(tris(pentafluorophenyl)borate)-2,3,5,6-tetrafluorophenyl)pyrrolidinium, 4-(tris(pentafluorophenyl)borate)-2,3,5,6-tetrafluoropyridinium, and any combination thereof.

33. The polymerization process of claim 25, wherein the catalyst system includes a scavenger.

34. The polymerization process of claim 25, wherein less than 5 wt % of the olefin polymer is insoluble after extraction in boiling xylene for 5 hours.

35. The polymerization process of claim 25, wherein 99 wt % of the olefin monomers introduced into a reactor for the polymerization process are converted to polymer.

* * * * *